US012766996B2

(12) United States Patent
Wang et al.

(10) Patent No.: US 12,766,996 B2
(45) Date of Patent: Oct. 20, 2026

(54) BATTERY SWAP CONTROL METHOD AND SYSTEM, MEDIUM, APPARATUS, AND BATTERY CHARGING AND SWAP STATION

(71) Applicant: NIO TECHNOLOGY (ANHUI) CO., LTD, Hefei City (CN)

(72) Inventors: Shuai Wang, Shanghai (CN); Feifei Zheng, Shanghai (CN); Huazhen Xu, Shanghai (CN); Jiyong Zou, Shanghai (CN); Tao Liu, Shanghai (CN)

(73) Assignee: NIO TECHNOLOGY (ANHUI) CO., LTD, Hefei City (CN)

( * ) Notice: Subject to any disclaimer, the term of this patent is extended or adjusted under 35 U.S.C. 154(b) by 812 days.

(21) Appl. No.: 18/297,043

(22) Filed: Apr. 7, 2023

(65) Prior Publication Data

US 2023/0322121 A1 Oct. 12, 2023

(30) Foreign Application Priority Data

Apr. 7, 2022 (CN) ......................... 202210365220.9

(51) Int. Cl.
*B60L 53/80* (2019.01)
*A62C 3/16* (2006.01)

(52) U.S. Cl.
CPC ................ *B60L 53/80* (2019.02); *A62C 3/16* (2013.01)

(58) Field of Classification Search
CPC .................................. B60L 53/80; A62C 3/16
See application file for complete search history.

(56) References Cited

U.S. PATENT DOCUMENTS

2011/0223459 A1* 9/2011 Heichal .............. H01M 50/262 403/33

FOREIGN PATENT DOCUMENTS

CN 107775324 3/2018
CN 109501754 3/2019
(Continued)

OTHER PUBLICATIONS

Official Action with English Translation for China Patent Application No. 202210365220.9, dated Jan. 21, 2024, 10 pages.
(Continued)

*Primary Examiner* — Robert Grant
(74) *Attorney, Agent, or Firm* — Sheridan Ross PC

(57) ABSTRACT

The disclosure relates to the technical field of battery swapping, and in particular to a battery swap control method and system, a medium, an apparatus, and a battery charging and swap station. An objective of the disclosure is to solve a problem that battery swap time is forced to be prolonged due to a fault in a locking process. To achieve the objective, the battery swap control method of the disclosure includes: acquiring a first real-time operation parameter of each locking/unlocking head in a locking process; determining, based on the first real-time operation parameter acquired, whether the locking/unlocking head has a locking fault; if any of the locking/unlocking heads has a locking fault, acquiring a number and positions of the locking/unlocking heads having the locking fault; determining whether a first locking completion condition is satisfied according to the acquired number and positions of locking/unlocking heads; and determining that locking is completed when the first locking completion condition is satisfied. In the disclosure, the battery swap time can be reduced and battery swap efficiency can be improved while locking reliability is ensured.

18 Claims, 5 Drawing Sheets

(56) References Cited

FOREIGN PATENT DOCUMENTS

| | | |
|---|---|---|
| CN | 109507913 | 3/2019 |
| CN | 111959338 | 11/2020 |
| CN | 112026581 | 12/2020 |
| CN | 112977150 | 6/2021 |
| EP | 3718683 | 10/2020 |
| WO | WO 2019/033721 | 2/2019 |

OTHER PUBLICATIONS

Official Action for European Patent Application No. 23166355.0, dated Oct. 6, 2023, 9 pages.

* cited by examiner

BATTERY SWAP CONTROL METHOD AND SYSTEM, MEDIUM, APPARATUS, AND BATTERY CHARGING AND SWAP STATION

CROSS-REFERENCE TO RELATED APPLICATIONS

This application claims the benefit of China Patent Application No. 202210365220.9 filed Apr. 7, 2022, the entire contents of which are incorporated herein by reference in its entirety.

TECHNICAL FIELD

The disclosure relates to the technical field of battery swapping, and in particular to a battery swap control method and system, a medium, an apparatus, and a battery charging and swap station.

BACKGROUND

With rapid growth in electric vehicle ownership in China, the issue of how to quickly replenish the electric vehicles with power has become increasingly prominent. As a quick replenishment solution, a battery charging and swap station can replenish the electric vehicles with power in a short time, making power replenishment as convenient as refuelling, so it is favoured by users of electric vehicles. In a battery swap process, a battery is attached/detached by locking/unlocking battery locking mechanisms (for example, locking bolts) through locking/unlocking mechanisms arranged on a battery swap apparatus.

During normal operation of the battery charging and swap station, in order to ensure locking reliability of the battery, a vehicle can leave only if all locking mechanisms on the battery are screwed to reach a target torque and no system error is reported. However, as the use time and number of battery swaps increase, it is inevitable that faults, such as slipping or jamming of the battery locking mechanisms, may occur in a locking process. At present, in the above cases, manual locking needs to be performed by the staff or even the battery locking mechanism needs to be replaced with a new one on site, which undoubtedly prolongs battery swap time and influences the normal operation of the battery charging and swap station and the travel planning of a vehicle owner.

Accordingly, there is a need for a novel technical solution to solve the problem described above.

BRIEF SUMMARY

In order to solve at least one of the above problems in the prior art, i.e., to solve a problem that battery swap time is forced to be prolonged due to faults in a locking process, the disclosure provides a battery swap control method, which is applied to a battery charging and swap station. The battery charging and swap station includes a parking platform and a battery swap apparatus, the parking platform is arranged to allow a vehicle with a battery to be swapped to be parked on the parking platform, the battery swap apparatus includes a plurality of locking/unlocking mechanisms, and the locking/unlocking mechanisms are arranged to be capable of locking/unlocking battery locking mechanisms by means of locking/unlocking heads.

The battery swap control method includes:

acquiring a first real-time operation parameter of each locking/unlocking head in a process of locking the battery locking mechanisms by the locking/unlocking mechanisms;

determining, based on the first real-time operation parameter acquired, whether the locking/unlocking head has a locking fault;

if any of the locking/unlocking heads has a locking fault, acquiring a number and positions of the locking/unlocking heads having the locking fault;

determining whether a first locking completion condition is satisfied according to the acquired number and positions of locking/unlocking heads; and determining that locking is completed when the first locking completion condition is satisfied.

In a preferred technical solution of the battery swap control method, the locking/unlocking heads are divided, according to positions of the battery locking mechanisms corresponding to the locking/unlocking heads relative to the battery, into first-type locking/unlocking heads and second-type locking/unlocking heads, where the first-type locking/unlocking heads are configured to lock/unlock the battery locking mechanisms that provide a main load-bearing function, and the second-type locking/unlocking heads are configured to lock/unlock the battery locking mechanisms that provide an auxiliary load-bearing function. The step of "determining whether a first locking completion condition is satisfied according to the acquired number and positions of locking/unlocking heads" further includes:

if none of the first-type locking/unlocking heads has a locking fault, determining whether the first locking completion condition is satisfied on the basis of the number and positions of the locking/unlocking heads having the locking fault in the second-type locking/unlocking heads; and/or if at most one of the first-type locking/unlocking heads has the locking fault and none of the second-type locking/unlocking heads has the locking fault, determining that the first locking completion condition is satisfied.

In a preferred technical solution of the battery swap control method, the first-type locking/unlocking heads include side locking/unlocking heads, and the second-type locking/unlocking heads include top locking/unlocking heads, middle locking/unlocking heads, and bottom locking/unlocking heads. The step of "determining whether the first locking completion condition is satisfied on the basis of the number and positions of the locking/unlocking heads having the locking fault in the second-type locking/unlocking heads" further includes:

if at most one of the top locking/unlocking heads, at most one of the middle locking/unlocking heads, and at most one of the bottom locking/unlocking heads have the locking fault, determining that the first locking completion condition is satisfied.

In a preferred technical solution of the battery swap control method, the step of "determining whether a first locking completion condition is satisfied according to the acquired number and positions of locking/unlocking heads" further includes:

if at least two of the first-type locking/unlocking heads have the locking fault, determining that the first locking completion condition is not satisfied;

if at least one of the first-type locking/unlocking heads and at least one of the second-type locking/unlocking heads have the locking fault, determining that the first locking completion condition is not satisfied; and if at least two locking/unlocking heads in at least one type of the top locking/unlocking heads, the middle locking/unlocking heads, and the bottom locking/unlocking heads have the locking fault, determining that the first locking completion condition is not satisfied.

In a preferred technical solution of the battery swap control method, the battery swap control method further includes:

sending out alarm information when the first locking completion condition is not satisfied.

In a preferred technical solution of the battery swap control method, the first real-time operation parameter includes a first real-time torque and the number of turns, and the step of "determining, based on the first real-time operation parameter acquired, whether the locking/unlocking head has a locking fault" further includes:

comparing each first real-time torque with a corresponding target torque threshold, and comparing each number of turns with a corresponding target threshold number of turns; and if the first real-time torque is smaller than the corresponding target torque threshold or the number of turns is smaller than the corresponding target threshold number of turns, determining that the locking/unlocking head has the locking fault.

In a preferred technical solution of the battery swap control method, before the step of "acquiring the number and positions of the locking/unlocking heads having the locking fault", the battery swap control method further includes:

controlling the locking/unlocking mechanisms to lock the battery locking mechanisms in response to a received one-button locking instruction;

acquiring a second real-time torque of each locking/unlocking head in the process of locking the battery locking mechanisms by the locking/unlocking mechanisms;

comparing each second real-time torque with a corresponding target torque threshold;

determining that locking is completed if each second real-time torque is greater than or equal to the corresponding target torque threshold; or acquiring the number and positions of the locking/unlocking heads having the locking fault if the second real-time torque is smaller than the corresponding target torque threshold.

In a preferred technical solution of the battery swap control method, the battery swap control method further includes:

transmitting fault position information to a server when the first locking completion condition is satisfied.

In a preferred technical solution of the battery swap control method, the battery swap control method further includes:

acquiring a current battery swap stage in response to a received fire alarm signal;

determining whether the battery swap stage is a preset stage; and controlling the locking/unlocking mechanisms to lock the battery locking mechanisms if the battery swap stage is the preset stage, where the preset stage includes at least one of a locking stage, an unlocking stage, and a shutdown and error reporting stage.

In a preferred technical solution of the battery swap control method, the battery swap control method further includes:

acquiring a second real-time operation parameter of each locking/unlocking head in a process of locking the battery locking mechanisms by the locking/unlocking mechanisms;

determining, based on the second real-time operation parameter acquired, whether a second locking completion condition is satisfied; and determining that locking is completed when the second locking completion condition is satisfied.

In a preferred technical solution of the battery swap control method, the second real-time operation parameter includes a third real-time torque and working time, and the step of "determining, based on the second real-time operation parameter acquired, whether a second locking completion condition is satisfied" further includes:

comparing each third real-time torque with a corresponding target torque threshold;

determining that the second locking completion condition is satisfied if each third real-time torque is greater than or equal to the corresponding target torque threshold; or comparing each period of working time with a preset time threshold if each third real-time torque is smaller than the corresponding target torque threshold; and determining that the second locking completion condition is satisfied if each period of working time is greater than or equal to the preset time threshold.

In a preferred technical solution of the battery swap control method, the battery charging and swap station further includes a centring apparatus and a hoisting apparatus, and the parking platform is further provided with a closable door, where the centring apparatus is arranged to be capable of centring the vehicle with a battery to be swapped, the hoisting apparatus is arranged to be capable of hoisting the vehicle with a battery to be swapped, and the closable door is arranged, in an opened state, to allow the locking/unlocking heads to pass through and lock/unlock the battery locking mechanisms. The battery swap control method further includes:

controlling, when it is determined that locking is completed, the centring apparatus, the hoisting apparatus and the battery swap apparatus to return to initial positions, and controlling the closable door to be closed, so as to enable the vehicle with a battery to be swapped to leave the parking platform.

In a preferred technical solution of the battery swap control method, the battery swap control method further includes:

determining whether the vehicle with a battery to be swapped is provided with a leaving condition if the battery swap stage is not the preset stage;

sending out prompt information so as to enable the vehicle with a battery to be swapped to leave the parking platform if the vehicle with a battery to be swapped is provided with the leaving condition; or conducting fire-fighting treatment on a thermal runaway battery if the vehicle with a battery to be swapped is not provided with the leaving condition.

In a preferred technical solution of the battery swap control method, the battery swap control method further includes:

conducting fire-fighting treatment on the thermal runaway battery after the vehicle leaves the parking platform.

The disclosure further provides a battery swap control system, which is applied to a battery charging and swap station. The battery charging and swap station includes a parking platform and a battery swap apparatus, the parking platform is arranged to allow a vehicle with a battery to be swapped to be parked on the parking platform, the battery swap apparatus includes a plurality of locking/unlocking mechanisms, and the locking/unlocking mechanisms are arranged to be capable of locking/unlocking battery locking mechanisms by means of locking/unlocking heads.

The battery swap control system includes:

a control module configured to control the locking/unlocking mechanisms to lock the battery locking mechanisms;

an acquiring module configured to acquire a first real-time operation parameter of each locking/unlocking head in a process of locking the battery locking mechanisms by the locking/unlocking mechanisms; and a determination module configured to determine, based on the first real-time operation parameter acquired, whether the locking/unlocking head has a locking fault.

The acquiring module is further configured to acquire the number and positions of the locking/unlocking heads having the locking fault when any of the locking/unlocking heads has a locking fault.

The determination module is further configured to determine whether a first locking completion condition is satisfied according to the acquired number and positions of locking/unlocking heads; and determine that locking is completed when the first locking completion condition is satisfied.

In a preferred technical solution of the battery swap control system, the locking/unlocking heads are divided, according to positions of the battery locking mechanisms corresponding to the locking/unlocking heads relative to the battery, into first-type locking/unlocking heads and second-type locking/unlocking heads, where the first-type locking/unlocking heads are configured to lock/unlock the battery locking mechanisms that provide a main load-bearing function, and the second-type locking/unlocking heads are configured to lock/unlock the battery locking mechanisms that provide an auxiliary load-bearing function. The determination module is further configured to determine whether the first locking completion condition is satisfied according to the acquired number and positions of locking/unlocking heads through following steps:

if none of the first-type locking/unlocking heads has a locking fault, determining whether the first locking completion condition is satisfied on the basis of the number and positions of the locking/unlocking heads having the locking fault in the second-type locking/unlocking heads; and/or if at most one of the first-type locking/unlocking heads has the locking fault and none of the second-type locking/unlocking heads has the locking fault, determining that the first locking completion condition is satisfied.

In a preferred technical solution of the battery swap control system, the first-type locking/unlocking heads include side locking/unlocking heads, and the second-type locking/unlocking heads include top locking/unlocking heads, middle locking/unlocking heads, and bottom locking/unlocking heads. The determination module is further configured to determine whether the first locking completion condition is satisfied on the basis of the number and positions of the locking/unlocking heads having the locking fault in the second-type locking/unlocking heads through the following step:

if at most one of the top locking/unlocking heads, at most one of the middle locking/unlocking heads, and at most one of the bottom locking/unlocking heads have the locking fault, determining that the first locking completion condition is satisfied.

In a preferred technical solution of the battery swap control system, the determination module is further configured to determine whether the first locking completion condition is satisfied according to the acquired number and positions of locking/unlocking heads through the following steps:

if at least two of the first-type locking/unlocking heads have the locking fault, determining that the first locking completion condition is not satisfied;

if at least one of the first-type locking/unlocking heads and at least one of the second-type locking/unlocking heads have the locking fault, determining that the first locking completion condition is not satisfied; and if at least two locking/unlocking heads in at least one type of the top locking/unlocking heads, the middle locking/unlocking heads, and the bottom locking/unlocking heads have the locking fault, determining that the first locking completion condition is not satisfied.

In a preferred technical solution of the battery swap control system, the battery swap control system further includes:

an information transmission module, where an alarm module is arranged to send out alarm information when the first locking completion condition is not satisfied.

In a preferred technical solution of the battery swap control system, the first real-time operation parameter includes a first real-time torque and the number of turns, and the determination module is further configured to determine, based on the first real-time operation parameter acquired, whether the locking/unlocking head has a locking fault through the following steps:

comparing each first real-time torque with a corresponding target torque threshold, and comparing each number of turns with a corresponding target threshold number of turns; and if the first real-time torque is smaller than the corresponding target torque threshold or the number of turns is smaller than the corresponding target threshold number of turns, determining that the locking/unlocking head has the locking fault.

In a preferred technical solution of the battery swap control system, the control module is further configured to control, before acquiring the number and positions of the locking/unlocking heads having the locking fault, the locking/unlocking mechanisms to lock the battery locking mechanisms in response to a received one-button locking instruction;

the acquiring module is further configured to acquire a second real-time torque of each locking/unlocking head in the process of locking the battery locking mechanisms by the locking/unlocking mechanisms;

the determination module is further configured to compare each second real-time torque with a corresponding target torque threshold; and determine that locking is completed if each second real-time torque is greater than or equal to the corresponding target torque threshold; and the acquiring module is further configured to acquire the number and positions of the locking/unlocking heads having the locking fault when the second real-time torque is smaller than the corresponding target torque threshold.

In a preferred technical solution of the battery swap control system, the information transmission module is further configured to transmit fault position information to a server when the first locking completion condition is satisfied.

In a preferred technical solution of the battery swap control system, the acquiring module is further configured to acquire a current battery swap stage in response to a received fire alarm signal;

the determination module is further configured to determine whether the battery swap stage is a preset stage; and the control module is further configured to control the locking/unlocking mechanisms to lock the battery locking mechanisms when the battery swap stage is the preset stage, where the preset stage includes at least one of a locking stage, an unlocking stage, and a shutdown and error reporting stage.

In a preferred technical solution of the battery swap control system, the acquiring module is further configured to acquire a second real-time operation parameter of each locking/unlocking head in the process of locking the battery locking mechanisms by the locking/unlocking mechanisms; and the determination module is further configured to determine, based on the second real-time operation parameter acquired, whether a second locking completion condition is satisfied; and determine that locking is completed when the second locking completion condition is satisfied.

In a preferred technical solution of the battery swap control system, the second real-time operation parameter includes a third real-time torque and working time, and the determination module is further configured to determine, based on the second real-time operation parameter acquired, whether the second locking completion condition is satisfied through the following steps:

comparing each third real-time torque with a corresponding target torque threshold;

determining that the second locking completion condition is satisfied if each third real-time torque is greater than or equal to the corresponding target torque threshold; or comparing each period of working time with a preset time threshold if each third real-time torque is smaller than the corresponding target torque threshold; and determining that the second locking completion condition is satisfied if each period of working time is greater than or equal to the preset time threshold.

In a preferred technical solution of the battery swap control system, the battery charging and swap station further includes a centring apparatus and a hoisting apparatus, and the parking platform is further provided with a closable door, where the centring apparatus is arranged to be capable of centring the vehicle with a battery to be swapped, the hoisting apparatus is arranged to be capable of hoisting the vehicle with a battery to be swapped, and the closable door is arranged, in an opened state, to allow the locking/unlocking heads to pass through and lock/unlock the battery locking mechanisms.

The control module is further configured to control, when it is determined that locking is completed, the centring apparatus, the hoisting apparatus and the battery swap apparatus to return to initial positions, and control the closable door to be closed, so as to enable the vehicle with a battery to be swapped to leave the parking platform.

In a preferred technical solution of the battery swap control system, the determination module is further configured to determine whether the vehicle with a battery to be swapped is provided with a leaving condition when the battery swap stage is not the preset stage;

the information transmission module is further configured to send out prompt information so as to enable the vehicle with a battery to be swapped to leave the parking platform when the vehicle with a battery to be swapped is provided with the leaving condition; and the control module is further configured to conduct fire-fighting treatment on a thermal runaway battery when the vehicle with a battery to be swapped is not provided with the leaving condition.

In a preferred technical solution of the battery swap control system, the control module is further configured to conduct fire-fighting treatment on the thermal runaway battery after the vehicle leaves the parking platform.

The disclosure further provides a computer-readable storage medium storing a plurality of program codes, where the program codes are adapted to be loaded and executed by a processor to implement the battery swap control method according to any one of the above preferred technical solutions.

The disclosure further provides a control apparatus, including:

a processor; and a memory, where the memory is adapted to store a plurality of program codes, and the program codes are adapted to be loaded and executed by the processor to implement the battery swap control method according to any one of the above preferred technical solutions.

The disclosure further provides a battery charging and swap station. The battery charging and swap station includes a parking platform and a battery swap apparatus, the parking platform is arranged to allow a vehicle with a battery to be swapped to be parked on the parking platform, the battery swap apparatus includes a plurality of locking/unlocking mechanisms, the locking/unlocking mechanisms are arranged to be capable of locking/unlocking battery locking mechanisms by means of locking/unlocking heads, and the battery charging and swap station further includes the above control apparatus.

In the disclosure, when any of the locking/unlocking heads has a locking fault, it is determined whether a first locking completion condition is satisfied on the basis of the number and positions of the locking/unlocking heads having the locking fault, and it is determined that locking is completed when the first locking completion condition is satisfied. Through the above control method, the battery swap time may be reduced and battery swap efficiency may be improved while locking reliability may be ensured. Through repeated tests, observation, analysis and comparison by the inventor, compared with the prior art in which it takes a lot of time to deal with locking faults of battery locking mechanisms, the battery swap control method of the disclosure may shorten battery swap service time by 20 min on average when there are faults of part of battery locking mechanisms, and further greatly improve user experience.

Further, the locking/unlocking heads are classified, and whether the first locking completion condition is satisfied is determined on the basis of the classified locking/unlocking heads, such that the disclosure may more accurately determine an influence degree of the locking/unlocking heads having the locking fault on locking reliability, and further ensure locking reliability when the first locking completion condition is satisfied.

Further, the locking/unlocking mechanisms are controlled to lock the battery locking mechanisms on the basis of the received one-button locking instruction before the number and positions of the locking/unlocking heads having the locking fault are acquired, and then it is determined whether locking is completed on the basis of the second real-time torque of the locking/unlocking heads in a locking process, such that the disclosure may quickly determine whether a current locking state satisfies locking reliability through the one-button locking instruction when there is a locking fault, and further reduce a system operation amount and improve battery swap service efficiency.

Further, the fault position information is transmitted to the server when the first locking completion condition is satisfied, such that a position of a battery locking mechanism with a fault may be informed to the after-sales service personnel in time, and further the after-sales service personnel may swap the battery locking mechanism with the fault.

Further, it is determined whether the current battery swap stage is the preset stage when the fire alarm signal is received, and the locking/unlocking mechanisms are controlled to lock the battery locking mechanisms when the current battery swap stage is the preset stage, such that the disclosure may quickly lock a vehicle when a fire alarm occurs in the battery charging and swap station, enable the vehicle to quickly leave the battery charging and swap station, and reduce user loss. Through repeated tests, observation, analysis and comparison by the inventor, when the control method is applied, the disclosure may enable the vehicle to quickly leave within 20 s after the fire alarm signal is triggered.

Further, it is determined that the second locking completion condition is satisfied when the third real-time torque of each locking/unlocking head is greater than or equal to the target torque threshold, or, it is determined that the second locking completion condition is satisfied when the above conditions are not satisfied but the working time of each locking/unlocking head reaches the preset time threshold, such that the disclosure may enable the vehicle to leave quickly on the premise of satisfying locking reliability.

Further, when locking is completed, the centring apparatus, the hoisting apparatus and the battery swap apparatus are controlled to return to the initial positions, and the closable door is controlled to be closed, such that convenient conditions may be provided for the vehicle to leave, and the vehicle is enabled to leave quickly.

Further, the prompt information is sent out when the vehicle is provided with the leaving condition, such that the vehicle may be prompted to leave as soon as possible, and fire-fighting efficiency may be improved. Fire-fighting treatment is conducted on the thermal runaway battery after the vehicle is not provided with the leaving condition, or, after the vehicle leaves the parking platform, such that fire-fighting treatment may be conducted on the thermal runaway battery in time, and loss of the battery charging and swap station and a user may be reduced.

Solution 1. A battery swap control method, applied to a battery charging and swap station, where the battery charging and swap station includes a parking platform and a battery swap apparatus, the parking platform is arranged to allow a vehicle with a battery to be swapped to be parked on the parking platform, and the battery swap apparatus includes a plurality of locking/unlocking mechanisms, which are arranged to be capable of locking/unlocking battery locking mechanisms by means of locking/unlocking heads, and the battery swap control method including:

acquiring a first real-time operation parameter of each locking/unlocking head in a process of locking the battery locking mechanisms by the locking/unlocking mechanisms;

determining, based on the first real-time operation parameter acquired, whether the locking/unlocking head has a locking fault;

if any of the locking/unlocking heads has a locking fault, acquiring a number and positions of the locking/unlocking heads having the locking fault;

determining whether a first locking completion condition is satisfied according to the acquired number and positions of locking/unlocking heads; and determining that locking is completed when the first locking completion condition is satisfied.

Solution 2. The battery swap control method according to solution 1, where the locking/unlocking heads are divided, according to positions of the battery locking mechanisms corresponding to the locking/unlocking heads relative to the battery, into first-type locking/unlocking heads and second-type locking/unlocking heads, where the first-type locking/unlocking heads are configured to lock/unlock the battery locking mechanisms that provide a main load-bearing function, and the second-type locking/unlocking heads are configured to lock/unlock the battery locking mechanisms that provide an auxiliary load-bearing function; and the step of "determining whether a first locking completion condition is satisfied according to the acquired number and positions of locking/unlocking heads" further includes:

if none of the first-type locking/unlocking heads has a locking fault, determining whether the first locking completion condition is satisfied on the basis of the number and positions of the locking/unlocking heads having the locking fault in the second-type locking/unlocking heads; and/or if at most one of the first-type locking/unlocking heads has the locking fault and none of the second-type locking/unlocking heads has the locking fault, determining that the first locking completion condition is satisfied.

Solution 3. The battery swap control method according to solution 2, where the first-type locking/unlocking heads include side locking/unlocking heads, the second-type locking/unlocking heads include top locking/unlocking heads, middle locking/unlocking heads, and bottom locking/unlocking heads, and the step of "determining whether the first locking completion condition is satisfied on the basis of the number and positions of the locking/unlocking heads having the locking fault in the second-type locking/unlocking heads" further includes:

if at most one of the top locking/unlocking heads, at most one of the middle locking/unlocking heads, and at most one of the bottom locking/unlocking heads have the locking fault, determining that the first locking completion condition is satisfied.

Solution 4. The battery swap control method according to solution 3, where the step of "determining whether a first locking completion condition is satisfied according to the acquired number and positions of locking/unlocking heads" further includes:

if at least two of the first-type locking/unlocking heads have the locking fault, determining that the first locking completion condition is not satisfied;

if at least one of the first-type locking/unlocking heads and at least one of the second-type locking/unlocking heads have the locking fault, determining that the first locking completion condition is not satisfied; and if at least two locking/unlocking heads in at least one type of the top locking/unlocking heads, the middle locking/unlocking heads, and the bottom locking/unlocking heads have the locking fault, determining that the first locking completion condition is not satisfied.

Solution 5. The battery swap control method according to solution 1, further including:

sending out alarm information when the first locking completion condition is not satisfied.

Solution 6. The battery swap control method according to solution 1, where the first real-time operation parameter includes a first real-time torque and the number of turns, and the step of "determining, based on the first real-time operation parameter acquired, whether the locking/unlocking head has a locking fault" further includes:

comparing each first real-time torque with a corresponding target torque threshold, and comparing each number of turns with a corresponding target threshold number of turns; and if the first real-time torque is smaller than the corresponding target torque threshold or the number of turns is smaller than the corresponding target threshold number of turns, determining that the locking/unlocking head has the locking fault.

Solution 7. The battery swap control method according to solution 1, where before the step of "acquiring the number and positions of the locking/unlocking heads having the locking fault", the battery swap control method further includes:

controlling the locking/unlocking mechanisms to lock the battery locking mechanisms in response to a received one-button locking instruction;

acquiring a second real-time torque of each locking/unlocking head in the process of locking the battery locking mechanisms by the locking/unlocking mechanisms;

comparing each second real-time torque with a corresponding target torque threshold;

determining that locking is completed if each second real-time torque is greater than or equal to the corresponding target torque threshold; or acquiring the number and positions of the locking/unlocking heads having the locking fault if the second real-time torque is smaller than the corresponding target torque threshold.

Solution 8. The battery swap control method according to solution 1, further including:

transmitting fault position information to a server when the first locking completion condition is satisfied.

Solution 9. The battery swap control method according to solution 1, further including:

acquiring a current battery swap stage in response to a received fire alarm signal;

determining whether the battery swap stage is a preset stage; and controlling the locking/unlocking mechanisms to lock the battery locking mechanisms if the battery swap stage is the preset stage, where the preset stage includes at least one of a locking stage, an unlocking stage, and a shutdown and error reporting stage.

Solution 10. The battery swap control method according to solution 9, further including:

acquiring a second real-time operation parameter of each locking/unlocking head in the process of locking the battery locking mechanisms by the locking/unlocking mechanisms;

determining, based on the second real-time operation parameter acquired, whether a second locking completion condition is satisfied; and determining that locking is completed when the second locking completion condition is satisfied.

Solution 11. The battery swap control method according to solution 10, where the second real-time operation parameter includes a third real-time torque and working time, and the step of "determining, based on the second real-time operation parameter acquired, whether a second locking completion condition is satisfied" further includes:

comparing each third real-time torque with a corresponding target torque threshold;

determining that the second locking completion condition is satisfied if each third real-time torque is greater than or equal to the corresponding target torque threshold; or comparing each period of working time with a preset time threshold if each third real-time torque is smaller than the corresponding target torque threshold; and determining that the second locking completion condition is satisfied if each period of working time is greater than or equal to the preset time threshold.

Solution 12. The battery swap control method according to solution 10, where the battery charging and swap station further includes a centring apparatus and a hoisting apparatus, and the parking platform is further provided with a closable door, where the centring apparatus is arranged to be capable of centring the vehicle with a battery to be swapped, the hoisting apparatus is arranged to be capable of hoisting the vehicle with a battery to be swapped, the closable door is arranged, in an opened state, to allow the locking/unlocking heads to pass through and lock/unlock the battery locking mechanisms, and the battery swap control method further includes:

controlling, when it is determined that locking is completed, the centring apparatus, the hoisting apparatus and the battery swap apparatus to return to initial positions, and controlling the closable door to be closed, so as to enable the vehicle with a battery to be swapped to leave the parking platform.

Solution 13. The battery swap control method according to solution 9, further including:

determining whether the vehicle with a battery to be swapped is provided with a leaving condition if the battery swap stage is not the preset stage;

sending out prompt information so as to enable the vehicle with a battery to be swapped to leave the parking platform if the vehicle with a battery to be swapped is provided with the leaving condition; or conducting fire-fighting treatment on a thermal runaway battery if the vehicle with a battery to be swapped is not meet the leaving condition.

Solution 14. The battery swap control method according to solution 12 or 13, further including:

conducting fire-fighting treatment on the thermal runaway battery after the vehicle leaves the parking platform.

Solution 15. A battery swap control system, applied to a battery charging and swap station, where the battery charging and swap station includes a parking platform and a battery swap apparatus, the parking platform is arranged to allow a vehicle with a battery to be swapped to be parked on the parking platform, and the battery swap apparatus includes a plurality of locking/unlocking mechanisms, which are arranged to be capable of locking/unlocking battery locking mechanisms by means of locking/unlocking heads, and the battery swap control system includes:

- a control module configured to control the locking/unlocking mechanisms to lock the battery locking mechanisms;
- an acquiring module configured to acquire a first real-time operation parameter of each locking/unlocking head in a process of locking the battery locking mechanisms by the locking/unlocking mechanisms; and
- a determination module configured to determine, based on the first real-time operation parameter acquired, whether the locking/unlocking head has a locking fault, where
- the acquiring module is further configured to acquire the number and positions of the locking/unlocking heads having the locking fault when any of the locking/unlocking heads has a locking fault; and
- the determination module is further configured to determine whether a first locking completion condition is satisfied according to the acquired number and positions of locking/unlocking heads; and
- determine that locking is completed when the first locking completion condition is satisfied.

Solution 16. The battery swap control system according to solution 15, where the locking/unlocking heads are divided, according to positions of the battery locking mechanisms corresponding to the locking/unlocking heads relative to the battery, into first-type locking/unlocking heads and second-type locking/unlocking heads, where the first-type locking/unlocking heads are configured to lock/unlock the battery locking mechanisms that provide a main load-bearing function, and the second-type locking/unlocking heads are configured to lock/unlock the battery locking mechanisms that provide an auxiliary load-bearing function; and the determination module is further configured to determine whether the first locking completion condition is satisfied according to the acquired number and positions of locking/unlocking heads through following steps:

- if none of the first-type locking/unlocking heads has a locking fault, determining whether the first locking completion condition is satisfied on the basis of the number and positions of the locking/unlocking heads having the locking fault in the second-type locking/unlocking heads; and/or
- if at most one of the first-type locking/unlocking heads has the locking fault and none of the second-type locking/unlocking heads has the locking fault, determining that the first locking completion condition is satisfied.

Solution 17. The battery swap control system according to solution 16, where the first-type locking/unlocking heads include side locking/unlocking heads, and the second-type locking/unlocking heads include top locking/unlocking heads, middle locking/unlocking heads, and bottom locking/unlocking heads; and the determination module is further configured to determine whether the first locking completion condition is satisfied on the basis of the number and positions of the locking/unlocking heads having the locking fault in the second-type locking/unlocking heads through the following step:

- if at most one of the top locking/unlocking heads, at most one of the middle locking/unlocking heads, and at most one of the bottom locking/unlocking heads have the locking fault, determining that the first locking completion condition is satisfied.

Solution 18. The battery swap control system according to solution 17, where the determination module is further configured to determine whether the first locking completion condition is satisfied according to the acquired number and positions of locking/unlocking heads through the following steps:

- if at least two of the first-type locking/unlocking heads have the locking fault, determining that the first locking completion condition is not satisfied;
- if at least one of the first-type locking/unlocking heads and at least one of the second-type locking/unlocking heads have the locking fault, determining that the first locking completion condition is not satisfied; and
- if at least two locking/unlocking heads in at least one type of the top locking/unlocking heads, the middle locking/unlocking heads, and the bottom locking/unlocking heads have the locking fault, determining that the first locking completion condition is not satisfied.

Solution 19. The battery swap control system according to solution 15, further including:

- an information transmission module, where an alarm module is arranged to send out alarm information when the first locking completion condition is not satisfied.

Solution 20. The battery swap control system according to solution 15, where the first real-time operation parameter includes a first real-time torque and the number of turns, and the determination module is further configured to determine, based on the first real-time operation parameter acquired, whether the locking/unlocking head has a locking fault through the following steps:

- comparing each first real-time torque with a corresponding target torque threshold, and comparing each number of turns with a corresponding target threshold number of turns; and
- if the first real-time torque is smaller than the corresponding target torque threshold or the number of turns is smaller than the corresponding target threshold number of turns, determining that the locking/unlocking head has the locking fault.

Solution 21. The battery swap control system according to solution 15, where

- the control module is further configured to control, before acquiring the number and positions of the locking/unlocking heads having the locking fault, the locking/unlocking mechanisms to lock the battery locking mechanisms in response to a received one-button locking instruction;
- the acquiring module is further configured to acquire a second real-time torque of each locking/unlocking head in the process of locking the battery locking mechanisms by the locking/unlocking mechanisms;
- the determination module is further configured to compare each second real-time torque with a corresponding target torque threshold; and
- determine that locking is completed if each second real-time torque is greater than or equal to the corresponding target torque threshold; or
- the acquiring module is further configured to acquire the number and positions of the locking/unlocking heads having the locking fault when the second real-time torque is smaller than the corresponding target torque threshold.

Solution 22. The battery swap control system according to solution 15, where

- the information transmission module is further configured to transmit fault position information to a server when the first locking completion condition is satisfied.

Solution 23. The battery swap control system according to solution 15, where the acquiring module is further configured to acquire a current battery swap stage in response to a received fire alarm signal;

the determination module is further configured to determine whether the battery swap stage is a preset stage; and the control module is further configured to control the locking/unlocking mechanisms to lock the battery locking mechanisms when the battery swap stage is the preset stage, where the preset stage includes at least one of a locking stage, an unlocking stage, and a shutdown and error reporting stage.

Solution 24. The battery swap control system according to solution 23, where the acquiring module is further configured to acquire a second real-time operation parameter of each locking/unlocking head in the process of locking the battery locking mechanisms by the locking/unlocking mechanisms; and the determination module is further configured to determine, based on the second real-time operation parameter acquired, whether a second locking completion condition is satisfied; and determine that locking is completed when the second locking completion condition is satisfied.

Solution 25. The battery swap control system according to solution 24, where the second real-time operation parameter includes a third real-time torque and working time, and the determination module is further configured to determine, based on the second real-time operation parameter acquired, whether the second locking completion condition is satisfied through the following steps:

comparing each third real-time torque with a corresponding target torque threshold;

determining that the second locking completion condition is satisfied if each third real-time torque is greater than or equal to the corresponding target torque threshold; or comparing each period of working time with a preset time threshold if each third real-time torque is smaller than the corresponding target torque threshold; and determining that the second locking completion condition is satisfied if each period of working time is greater than or equal to the preset time threshold.

Solution 26. The battery swap control system according to solution 24, where the battery charging and swap station further includes a centring apparatus and a hoisting apparatus, and the parking platform is further provided with a closable door, where the centring apparatus is arranged to be capable of centring the vehicle with a battery to be swapped, the hoisting apparatus is arranged to be capable of hoisting the vehicle with a battery to be swapped, the closable door is arranged, in an opened state, to allow the locking/unlocking heads to pass through and lock/unlock the battery locking mechanisms, and the control module is further configured to control, when it is determined that locking is completed, the centring apparatus, the hoisting apparatus and the battery swap apparatus to return to initial positions, and control the closable door to be closed, so as to enable the vehicle with a battery to be swapped to leave the parking platform.

Solution 27. The battery swap control system according to solution 23, where the determination module is further configured to determine whether the vehicle with a battery to be swapped is provided with a leaving condition when the battery swap stage is not the preset stage;

the information transmission module is further configured to send out prompt information so as to enable the vehicle with a battery to be swapped to leave the parking platform when the vehicle with a battery to be swapped is provided with the leaving condition; and the control module is further configured to conduct fire-fighting treatment on a thermal runaway battery when the vehicle with a battery to be swapped is not provided with the leaving condition.

Solution 28. The battery swap control system according to solution 26 or 27, where the control module is further configured to conduct fire-fighting treatment on the thermal runaway battery after the vehicle leaves the parking platform.

Solution 29. A computer-readable storage medium, storing a plurality of program codes, where the program codes are adapted to be loaded and executed by a processor to implement the battery swap control method according to any one of solutions 1 to 14.

Solution 30: A control apparatus, including:

a processor; and a memory, where the memory is adapted to store a plurality of program codes, and the program codes are adapted to be loaded and executed by the processor to implement the battery swap control method according to any one of solutions 1 to 14.

Solution 31. A battery charging and swap station, where the battery charging and swap station includes a parking platform and a battery swap apparatus, the parking platform is arranged to allow a vehicle with a battery to be swapped to be parked on the parking platform, the battery swap apparatus includes a plurality of locking/unlocking mechanisms, which are arranged to be capable of locking/unlocking battery locking mechanisms by means of locking/unlocking heads, and the battery charging and swap station further includes the control apparatus according to solution 30.

BRIEF DESCRIPTION OF THE SEVERAL VIEWS OF THE DRAWINGS

A battery swap control method and system, a medium, an apparatus, and a battery charging and swap station of the disclosure will be described below with reference to the accompanying drawings. In the accompanying drawings.

LIST OF REFERENCE NUMERALS

1. Parking platform; 2. Battery swap apparatus; 201-210. Locking/unlocking head; 23. Battery bearing platform; 3.

Hoisting apparatus; 4. Centring apparatus; 5. Closable door; 6. Battery; D1-D10. Battery locking mechanism; 100. Battery swap control system; 110. Control module; 120. Acquiring module; 130. Determination module; 140. Information transmission module.

DETAILED DESCRIPTION

Preferred implementations of the disclosure are described below with reference to the accompanying drawings. Those skilled in the art should understand that these implementations are only used to explain the technical principles of the disclosure, and are not intended to limit the scope of protection of the disclosure.

It should be noted that in the description of the disclosure, the terms, such as "upper", "lower", "vertical", and "horizontal", that indicate directions or positional relationships, are based on the directions or positional relationships shown in the accompanying drawings only for convenience of description, do not indicate or imply that the apparatus or element must have a specific orientation or be constructed and operated in a specific orientation, and therefore cannot be construed as limitation to the disclosure. In addition, the terms "first", "second", and "third" are for descriptive purposes only, and cannot be interpreted as indicating or implying relative importance.

In addition, it should also be noted that, in the description of the disclosure, the terms "connect" should be interpreted in a broad sense unless explicitly defined and limited otherwise, which, for example, can be fixedly connected, detachably connected or connected into a whole; or can be mechanically connected or electrically connected; or can be directly connected, or indirectly connected by means of an intermediate medium. For those skilled in the art, specific meanings of the above terms in the disclosure can be interpreted according to the specific situation.

Figure 1:
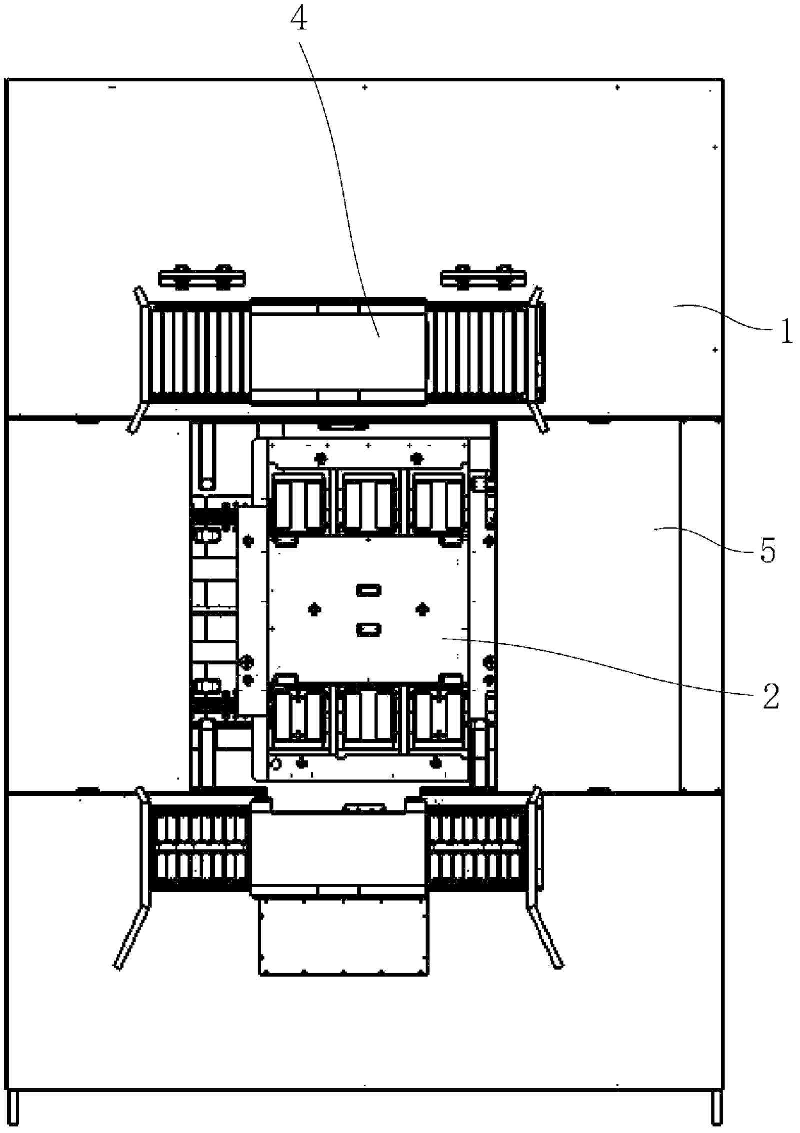
FIG. 1 is a top view of a parking platform of a battery charging and swap station according to the disclosure.
Figure 2:
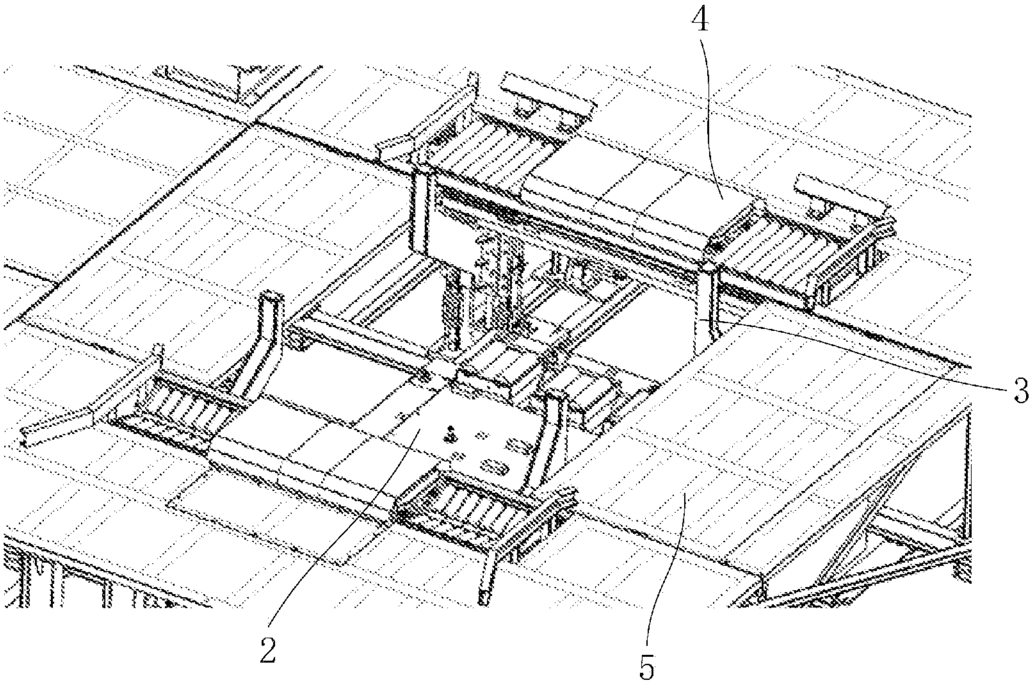
FIG. 2 is a partially enlarged view of a parking platform of a battery charging and swap station according to the disclosure.
Figure 3:
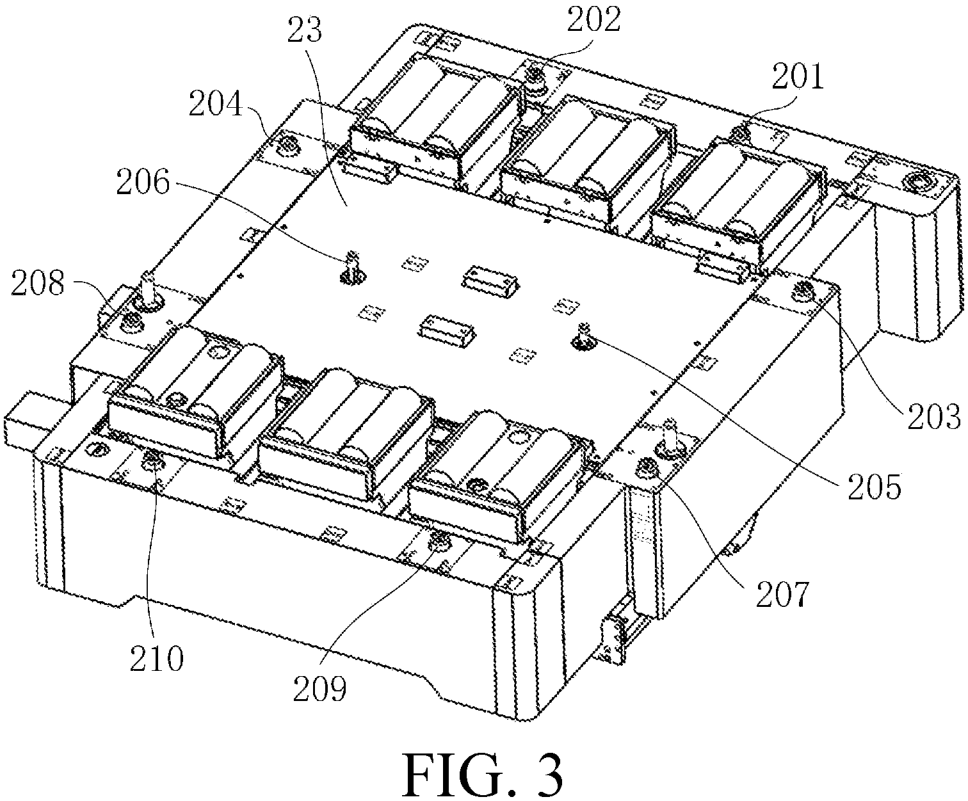
FIG. 3 is an assembly diagram of a battery swap apparatus according to the disclosure.
Figure 4:
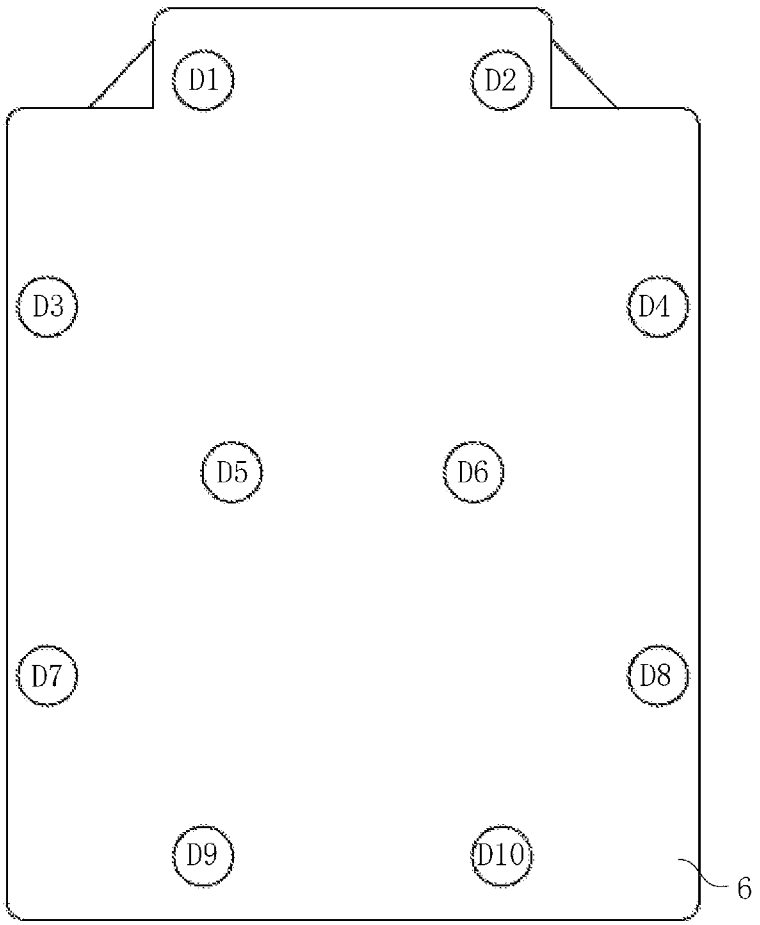
FIG. 4 is a schematic layout diagram of battery locking mechanisms on a battery according to the disclosure.

First, with reference to FIGS. 1-4, a battery charging and swap station of the disclosure is described. FIG. 1 is a top view of a parking platform of a battery charging and swap station according to the disclosure. FIG. 2 is a partially enlarged view of a parking platform of a battery charging and swap station according to the disclosure. FIG. 3 is an assembly diagram of a battery swap apparatus according to the disclosure. FIG. 4 is a schematic layout diagram of battery locking mechanisms on a battery according to the disclosure.

As shown in FIGS. 1 and 2, in an implementation, the battery charging and swap station includes a parking platform 1, a battery swap apparatus 2, a hoisting apparatus 3, and a centring apparatus 4.

The parking platform 1 is built from metal frames and metal plates. One end (i.e., a lower end shown in FIG. 1) of the parking platform in a lengthwise direction (i.e., a vertical direction in FIG. 1) is an entrance, at which a gate for a vehicle to enter and exit is provided for the battery charging and swap station. The other end (i.e., an upper end shown in FIG. 1) of the parking platform 1 in the lengthwise direction forms a closed end with the battery charging and swap station. A closable door 5 is arranged in the middle of the parking platform 1, the closable door 5 is arranged in a width direction (i.e., a horizontal direction in FIG. 1) of the parking platform 1 in a slidable and closable manner, and two roller apparatuses for supporting vehicle wheels are arranged on each of front and rear sides of the closable door 5 in the lengthwise direction of the parking platform 1. When a vehicle with a battery to be swapped is driven to the parking platform 1, front and rear wheels are supported and positioned by the roller apparatuses, respectively, such that the vehicle is positioned in the lengthwise direction. There is a specific gap between the parking platform 1 and the ground, which allows the battery swap apparatus 2 to bear a battery to enter or exit.

The vehicle hoisting apparatus 3 includes four hoisting support rods, which may hoist a chassis of the vehicle from different positions, respectively, so as to hoist the vehicle as a whole. The vehicle centring apparatuses 4 are vehicle wheel push rods. There are four vehicle wheel push rods. The four push rods are arranged at the four roller apparatuses, respectively, and are capable of moving back and forth in the width direction of the parking platform 1. Each push rod pushes one vehicle wheel from an inner side of the vehicle wheel. Under joint action of the four push rods, the vehicle may be centred and positioned.

With reference to FIG. 3, the battery swap apparatus 2 includes a battery bearing platform 23, a lifting mechanism, and a plurality of locking/unlocking mechanisms (the lifting mechanism and the locking/unlocking mechanisms are not shown in the figures), where the battery bearing platform 23 is configured to bear the battery, the lifting mechanism is configured to drive the battery bearing platform 23 to be lifted, and the locking/unlocking mechanisms are configured to lock/unlock the battery. Specifically, the lifting mechanism may be a scissor lifter, the battery bearing platform 23 is connected to the scissor lifter, and the scissor lifter drives the battery bearing platform 23 to be lifted, such that the battery bearing platform 23 may stretch out from the closable door 5 or draw back to the closable door 5. The battery is fixedly connected to the chassis of the vehicle by means of the battery locking mechanisms, the locking/unlocking mechanisms are fixedly arranged on the battery bearing platform 23, the locking/unlocking mechanisms include a driving mechanism and locking/unlocking heads (201-210), and the driving mechanism drives the locking/unlocking heads to lock/unlock the battery locking mechanisms, such that the battery is attached and detached. In the battery swap apparatus 2 shown in FIG. 3, there are ten locking/unlocking mechanisms (201-210), in which eight locking/unlocking mechanisms are arranged around the battery bearing platform 23 and two locking/unlocking mechanisms are arranged in the middle of the battery bearing platform 23.

With reference to FIG. 4, a battery 6 is provided with a plurality of battery locking mechanisms (D1-D10), and positions of the locking mechanisms correspond to those of the locking/unlocking mechanisms on the battery bearing platform 23. In the disclosure, the battery locking mechanisms may be classified according to positions of the battery locking mechanisms relative to the battery 6. With an orientation shown in FIG. 4 as an example, the battery locking mechanisms include top locking mechanisms (D1, D2), middle locking mechanisms (D5, D6), bottom locking mechanisms (D9, D10) and side locking mechanisms (D3, D4, D7, D8), where for the battery 6 mounted on the chassis of the vehicle, the side locking mechanisms provide a main load-bearing function, and the top locking mechanisms, the middle locking mechanisms and the bottom locking mechanisms provide an auxiliary load-bearing function. The locking mechanisms may be bolts, or special locking members for the battery 6, for example, bolts having anti-loosening mechanisms.

With reference to FIG. 3, corresponding to the battery locking mechanisms, the locking/unlocking heads include top locking/unlocking heads (201, 202), middle locking/unlocking heads (205, 206), bottom locking/unlocking heads (209, 210) and side locking/unlocking heads (203, 204, 207, 208). The locking/unlocking heads are divided into two types according to bearing importance of the battery locking mechanisms. The first-type locking/unlocking heads include the side locking/unlocking heads, and the second-type locking/unlocking heads include the top locking/unlocking heads, the middle locking/unlocking heads, and the bottom locking/unlocking heads.

Certainly, an arrangement mode of the battery charging and swap station in the prior art is not limited herein, and the above implementations are only illustrative, not for limiting the scope of protection of the disclosure. Those skilled in the art can apply the disclosure to scenarios of other battery charging and swap stations without changing the principle of the disclosure. For example, those skilled in the art may apply the disclosure to battery swap apparatuses 2 and batteries 6 in other forms, as long as the battery swap apparatuses 2 may lock/unlock the battery locking mechanisms by means of the locking/unlocking heads.

Figure 5:
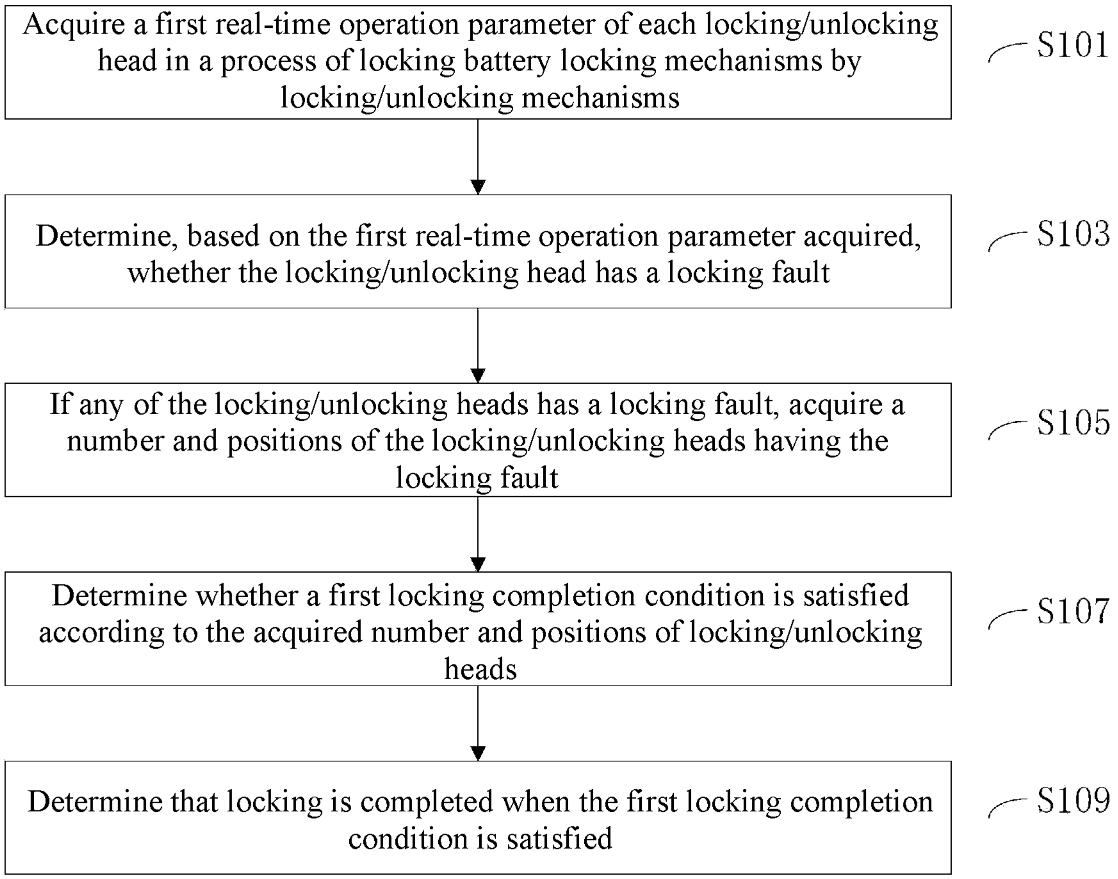
FIG. 5 is a flowchart of a battery swap control method according to the disclosure.

The following describes, with reference to FIG. 5, a battery swap control method according to the disclosure. FIG. 5 is a flowchart of a battery swap control method according to the disclosure.

As shown in FIG. 5, in order to solve a problem that battery swap time is forced to be prolonged due to a fault in a locking process, the battery swap control method of the disclosure includes the following steps.

At S101, a first real-time operation parameter of each locking/unlocking head is acquired in a process of locking the battery locking mechanisms by the locking/unlocking mechanisms. For example, the first real-time operation parameters may include one or both of the real-time torque and the number of turns of the locking/unlocking head. The real-time torque is output torque of a drive motor in a driving mechanism corresponding to the locking/unlocking head, and the torque may be computed according to output current of the drive motor for example. The number of turns is the number of turns of the locking/unlocking head, and the number of turns may be computed according to the number of turns of an output shaft of the drive motor for example. Certainly, those skilled in the art can also acquire the real-time torque and the number of turns of the locking/unlocking head in other ways, which are not limited by the disclosure.

At S103, based on the first real-time operation parameter acquired, it is determined whether the locking/unlocking head has a locking fault. For example, after the real-time torque and/or the number of turns of the locking/unlocking head are/is acquired, it is determined whether any of the locking/unlocking heads has a locking fault on the basis of a comparison result between the real-time torque and/or the number of turns and a preset value. It should be noted that because the disclosure acquires and determine operation parameters of the locking/unlocking heads accordingly in an application process, error reporting information is reported for the locking/unlocking heads, not the battery locking mechanisms, such that the description that "any of the locking/unlocking heads has a locking fault" in the disclosure does indicate that a locking/unlocking mechanism itself has a fault, and fault conditions of the battery locking mechanisms are reflected by acquiring and determining the operation parameters of the locking/unlocking heads in the locking/unlocking mechanisms, such as jamming or slipping of the battery locking mechanisms.

At S105, if any of the locking/unlocking heads has a locking fault, a number and position(s) of the locking/unlocking head(s) having the locking fault are acquired. For example, when any of the locking/unlocking heads has a locking fault, the positions and number of the locking/unlocking heads with errors need to be further acquired, and further an influence degree of a current battery locking mechanism with a fault on normal use of the battery is determined according to the positions and number of the locking/unlocking heads. The number of locking/unlocking heads having the locking fault may be acquired, for example, by counting the number of error reporting information, and the positions of the locking/unlocking heads having the locking fault may be acquired, for example, on the basis of serial numbers of the locking/unlocking heads. Certainly, the above acquiring methods are only illustrative, and those skilled in the art can choose other acquiring methods on the basis of specific application scenarios.

At S107, it is determined whether a first locking completion condition is satisfied according to the acquired number and positions of locking/unlocking heads. For example, the first locking completion condition is used to determine an influence degree of a battery locking mechanism with a fault on normal use of a battery, and setting of the condition may be determined on the basis of tests or experience. For example, battery locking mechanisms with different numbers and positions may have faults, then continuous running time of the vehicle under the faults is recorded, and the number and positions of battery locking mechanisms having the locking fault in a test group with the continuous running time greater than a certain threshold are taken as a number critical value and a position critical value in the first locking completion condition. After the number and positions of the locking/unlocking heads having the locking fault are acquired, the number and positions are substituted into the first locking completion condition for determination, and whether the first locking completion condition is satisfied under a current condition is determined.

At S109, it is determined that locking is completed when the first locking completion condition is satisfied. For example, if the first locking completion condition is satisfied after the number and positions of current locking/unlocking heads having the locking fault are substituted into the first locking completion condition, the current locking/unlocking heads having the locking fault have less influence on normal operation of the vehicle. In this case, it is determined that locking is completed, and the vehicle may leave the battery charging and swap station. If the first locking completion condition is not satisfied after the number and positions of current locking/unlocking heads having the locking fault are substituted into the first locking completion condition, the current locking/unlocking heads having the locking fault have a great influence on normal operation of the vehicle, and it is determined that locking is not completed.

In the disclosure, when any of the locking/unlocking heads has a locking fault, whether the first locking completion condition is satisfied is determined on the basis of the number and positions of the locking/unlocking heads having the locking fault, and it is determined that locking is completed when the first locking completion condition is satisfied. Through the above control method, the battery swap time may be reduced and battery swap efficiency may be improved while locking reliability may be ensured. Through repeated tests, observation, analysis and comparison by the inventor, compared with the prior art in which it takes a lot of time to deal with locking faults of battery locking mechanisms, the battery swap control method of the disclosure may shorten battery swap service time by 20 min on average when there are faults of part of battery locking mechanisms, and further greatly improve user experience.

The preferred implementations of the disclosure are described below in combination with arrangement modes of the battery charging and swap station as shown in FIGS. 1-4.

In an implementation, the first real-time operation parameters include first real-time torque and the number of turns. S103 further includes the following steps: each first real-time torque is compared with a corresponding target torque threshold, and each number of turns is compared with a corresponding target threshold number of turns; and if the first real-time torque is smaller than the corresponding target torque threshold or the number of turns is smaller than the corresponding target threshold number of turns, it is determined that the locking/unlocking head has the locking fault.

For example, each locking/unlocking mechanism corresponds to a target torque threshold and a target threshold number of turns, and different locking mechanisms may have the same or different target torque thresholds and target threshold numbers of turns. After locking is started, each locking/unlocking mechanism conducts a locking operation with the own corresponding target torque threshold and target threshold number of turns as targets. In a locking process, the first real-time torque and the number of turns of each locking/unlocking head are acquired, and if the first real-time torque of each locking/unlocking head is greater than or equal to the corresponding target torque threshold and the number of turns of each locking/unlocking head is greater than or equal to the corresponding target threshold number of turns, it is determined that locking is completed.

Alternatively, if the first real-time torque of at least one locking/unlocking head is smaller than the corresponding target torque threshold, or the number of turns of at least one locking/unlocking head is smaller than the target threshold number of turns, it is determined that there is a locking fault. When the first real-time torque is smaller than the target torque threshold and the number of turns is greater than or equal to the target threshold number of turns, the battery locking mechanism has a slipping problem. When the first real-time torque is greater than or equal to the target torque threshold and the number of turns is smaller than the target threshold number of turns, the battery locking mechanism has a jamming problem.

In an implementation, with the first-type locking/unlocking heads as a basis of classification, S105 is further described. Specifically, S105 includes the following sub-steps.

(1) If none of the first-type locking/unlocking heads has a locking fault, it is determined whether the first locking completion condition is satisfied on the basis of the number and positions of the locking/unlocking heads having the locking fault in the second-type locking/unlocking heads.

Specifically, if at most one of the top locking/unlocking heads, at most one of the middle locking/unlocking heads, and at most one of the bottom locking/unlocking heads have the locking fault, it is determined that the first locking completion condition is satisfied; and if at least two locking/unlocking heads in at least one type of the top locking/unlocking heads, the middle locking/unlocking heads, and the bottom locking/unlocking heads have the locking fault, it is determined that the first locking completion condition is not satisfied.

As mentioned above, the first-type locking/unlocking heads include the side locking/unlocking heads (203, 204, 207, 208), and the second-type locking/unlocking heads include the top locking/unlocking heads (201, 202), the middle locking/unlocking heads (205, 206), and the bottom locking/unlocking heads (209, 210). The battery locking mechanisms corresponding to the first-type locking/unlocking heads provide a main load-bearing function in fixation of the battery, such that locking results of the first-type locking/unlocking heads, i.e., the four side locking/unlocking heads, directly influence overall mounting stability of the battery. Through test verification, the inventor finds that a plurality of second-type locking/unlocking heads are allowed to have locking faults on the premise that none of the first-type locking/unlocking heads has a locking fault. More specifically, in the second-type locking/unlocking heads, one locking/unlocking head in each type of locking/unlocking heads is allowed to have a locking fault. For example, on the premise that there is no locking fault of the four side locking/unlocking heads, when there are locking faults of the top locking/unlocking head 201, the middle locking/unlocking head 205 and the bottom locking/unlocking head 209, it is determined that the first locking completion condition is satisfied. On the premise that there is no locking fault of the four side locking/unlocking heads, when there are locking faults of the top locking/unlocking heads 201 and 202, it is determined that the first locking completion condition is not satisfied.

(2) If at most one of the first-type locking/unlocking heads has the locking fault and none of the second-type locking/unlocking heads has the locking fault, it is determined that the first locking completion condition is satisfied; and if at least one of the first-type locking/unlocking heads and at least one of the second-type locking/unlocking heads have the locking fault, it is determined that the first locking completion condition is not satisfied.

Through test verification, the inventor finds that when at most one of the first-type locking/unlocking heads, i.e., the four side locking/unlocking heads, has a locking fault stability of the battery is already influenced to some extent. In this case, only when none of the second-type locking/unlocking heads has a locking fault, overall mounting stability of the battery may be ensured. For example, on the premise that there is a locking fault of the side locking/unlocking head 203, if there is no locking fault of the top locking/unlocking head, the middle locking/unlocking head and the bottom locking/unlocking head, it is determined that the first locking completion condition is satisfied. On the premise that there is a locking fault of the side locking/unlocking head 203, if there is a locking fault of the top locking/unlocking head 201, it is determined that the first locking completion condition is not satisfied.

(3) It is determined that the first locking completion condition is not satisfied if at least two locking/unlocking heads in the first-type locking/unlocking heads have the locking fault.

Through test verification, the inventor finds that when there are locking faults of two locking/unlocking heads of the first-type locking/unlocking heads, i.e., the four side locking/unlocking heads, mounting stability of the battery cannot be ensured. In this case, no matter whether there is a locking fault of the second-type locking/unlocking heads, it is determined that the first locking completion condition is not satisfied.

The locking/unlocking heads are classified, and whether the first locking completion condition is satisfied is determined on the basis of the classified locking/unlocking heads, such that the disclosure may more accurately determine an influence degree of the locking/unlocking heads having the locking fault on locking reliability, and further ensure locking reliability when the first locking completion condition is satisfied.

In an implementation, the battery swap control method further includes the following step: alarm information is sent out when the first locking completion condition is not satisfied.

For example, when the first locking completion condition is not satisfied, the battery swap apparatus cannot complete a locking operation, and the vehicle cannot leave the battery charging and swap station. In this case, the alarm information is sent out, and the staff is asked to conduct a manual operation. The alarm information may be transmitted to the staff through voice, texts, images, etc., and specific modes are not repeated herein.

In an implementation, before the number and positions of the locking/unlocking heads having the locking fault are acquired, the battery swap control method further includes the following steps: the locking/unlocking mechanisms are controlled to lock the battery locking mechanisms in response to a received one-button locking instruction; a second real-time torque of each locking/unlocking head is acquired in the process of locking the battery locking mechanisms by the locking/unlocking mechanisms; each second real-time torque is compared with a corresponding target torque threshold; it is determined that locking is completed if each second real-time torque is greater than or equal to the corresponding target torque threshold; or the number and positions of the locking/unlocking heads having the locking fault are acquired if the second real-time torque is smaller than the corresponding target torque threshold.

Specifically, the one-button locking instruction may be triggered manually by the staff or by the backstage service personnel. When any of the locking/unlocking heads has a locking fault, the battery charging and swap station may transmit fault information to the staff or the backstage service personnel, and the staff or the backstage service personnel may trigger the one-button locking instruction. After the one-button locking instruction is triggered, the locking completion condition is changed to determine only the real-time torque of each locking/unlocking mechanism and not the number of turns. This is because compared with slipping of the battery locking mechanisms, jamming of the battery locking mechanisms may at least ensure that the battery locking mechanisms cannot fall off and may play a certain role in fastening the battery. Therefore, after the one-button locking instruction is triggered, the second real-time torque of each locking/unlocking head is acquired, and then each second real-time torque is compared with the corresponding target torque threshold. The target torque threshold corresponding to each locking/unlocking head may be the same as the above target torque threshold or not, and those skilled in the art may choose the target torque threshold on the basis of specific application scenarios. It is determined that locking is completed if the second real-time torque of each locking/unlocking head is greater than or equal to the corresponding target torque threshold. The number and positions of the locking/unlocking heads having the locking fault are further acquired if the second real-time torque is smaller than the corresponding target torque threshold, and whether the first locking completion condition is satisfied is determined according to the acquired number and positions of the locking/unlocking heads. Reference may be made to the above implementations for a specific process.

The locking/unlocking mechanisms are controlled to lock the battery locking mechanisms on the basis of the received one-button locking instruction before the number and positions of the locking/unlocking heads having the locking fault are acquired, and then whether locking is completed is determined on the basis of the second real-time torque of the locking/unlocking heads in a locking process, such that the disclosure may quickly determine whether a current locking state satisfies locking reliability through the one-button locking instruction when there is a locking fault, and further reduce a system operation amount and improve battery swap service efficiency.

In an implementation, the battery swap control method further includes the following step: fault position information is transmitted to a server when the first locking completion condition is satisfied.

For example, although it is determined that locking is completed and the vehicle may leave the parking platform when the first locking completion condition is satisfied, some battery locking mechanisms are in a fault state, and the vehicle still has a certain degree of risk, so it is necessary to deal with the faults as soon as possible. In the disclosure, when the first locking completion condition is satisfied, more accurately, after battery swap of the vehicle is completed and the vehicle leaves the parking platform, the fault position information is automatically transmitted to the server, such that information of a battery locking mechanism with a fault may be transmitted to the backstage service personnel in time, and further the backstage service personnel may negotiate with the user to swap the battery locking mechanism with the fault. The fault position information refers to position information of the battery locking mechanism with the fault, and the position information may be acquired through error reporting information of the locking/unlocking heads, and transmitted to the after-sales service personnel through short messages, telephones, system prompt information, etc.

The fault position information is transmitted to the server when the first locking completion condition is satisfied, such that a position of the battery locking mechanism with a fault may be informed to the after-sales service personnel in time, and further the after-sales service personnel may swap the battery locking mechanism with the fault.

Figure 6:
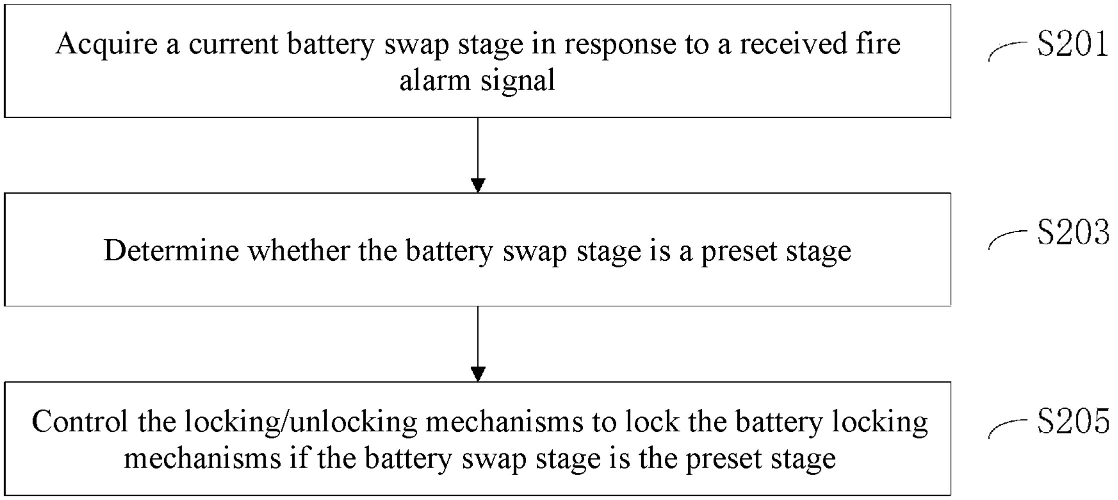
FIG. 6 is a flowchart of a battery swap control method according to the disclosure when a fire alarm signal is received.

With reference to FIG. 6, in an implementation, the battery swap control method further includes the following steps.

At S201, a current battery swap stage is acquired in response to a received fire alarm signal. For example, the fire alarm signal is triggered mostly when a battery temperature in the battery charging and swap station is detected to be too high or thermal runaway occurs. After the fire alarm signal is received, if the vehicle with a battery to be swapped is in a battery swap process, a locking process of a battery pack needs to be completed in the shortest time, such that the vehicle may quickly leave the parking platform so as to reduce loss of the vehicle. In this case, the current battery swap stage is acquired.

In the disclosure, the battery swap stage includes, but is not limited to, a positioning stage, an unlocking stage, a transfer stage, a locking stage, a reset stage, a shutdown and error reporting stage, etc. In the stages:

The positioning stage mainly refers to a process that the vehicle enters the parking platform from outside of the battery charging and swap station and is finally centred and positioned by roller apparatuses and the centring apparatus. A completion signal of the stage may be a centring completion signal sent out after centring of a centring mechanism is completed.

The unlocking stage mainly refers to a process that the battery bearing platform is lifted from a position under the vehicle to an unlocking working position under the action of the lifting mechanism, and then the locking/unlocking mechanisms unlock the battery locking mechanisms on the chassis of the vehicle. A completion signal of the stage may be a position signal sent out when the battery is completely separated from the chassis and is supported by the battery bearing platform and lowered to a transfer position.

The transfer stage mainly refers to a process of battery swap between the battery swap apparatus and a battery rack in the battery charging and swap station. A completion signal may be a connection completion signal sent out after a battery to be mounted is transferred to the battery bearing platform and positioned and connected with the battery bearing platform.

The locking stage mainly refers to a process that the battery bearing platform bears the battery to be mounted to be lifted from the position under the vehicle to a locking working position under the action of the lifting mechanism, and then the locking/unlocking mechanisms lock the battery locking mechanisms so as to fix the battery to be mounted onto the chassis of the vehicle. A completion signal of the stage may be an electrical signal sent out when all the locking/unlocking mechanisms are locked with no locking fault.

The reset stage mainly refers to a process that all devices such as the battery swap apparatus, the centring apparatus, the hoisting apparatus, and the closable door are reset to the initial positions after the battery is locked. A completion signal of the stage may be a position signal transmitted after all apparatuses are reset to the initial positions.

In the disclosure, the shutdown and error reporting stage mainly refers to a temporary shutdown and error reporting process at the locking stage and the unlocking stage (i.e., stages at which the vehicle is lifted and the battery swap apparatus is in the locking working position or unlocking working position), such as a locking fault, an unlocking fault, or person/thing intrusion. When shutdown and error reporting occur, error information may be sent out.

Certainly, a division mode and the completion signal of each of the above stages are only illustrative, and those skilled in the art can adjust the above stages without changing the principle of the disclosure.

At S203, it is determined whether the battery swap stage is a preset stage. For example, the preset stage includes at least one of a locking stage, an unlocking stage, and a shutdown and error reporting stage. After the fire alarm signal is received, the current stage is determined according to the received signal, and whether the stage is one of the above three preset stages is determined.

At S205, the locking/unlocking mechanisms are controlled to lock the battery locking mechanisms if the battery swap stage is the preset stage. For example, if the current battery swap stage is one of the above three preset stages, the battery is not mounted on the vehicle, such that the battery needs to be quickly locked, and further the vehicle may quickly leave. In this case, the locking/unlocking mechanisms are preferentially controlled to lock the battery locking mechanisms.

It is determined whether the current battery swap stage is the preset stage when the fire alarm signal is received, and the locking/unlocking mechanisms are controlled to lock the battery locking mechanisms when the current battery swap stage is the preset stage, such that the disclosure may quickly lock the vehicle when a fire alarm occurs in the battery charging and swap station, enable the vehicle to quickly leave the battery charging and swap station, and reduce user loss. Through repeated tests, observation, analysis and comparison by the inventor, when the control method is applied, the disclosure may enable the vehicle to quickly leave within 20 s after the fire alarm signal is triggered.

In an implementation, the battery swap control method further includes the following steps: a second real-time operation parameter of each locking/unlocking head is acquired in the process of locking the battery locking mechanisms by the locking/unlocking mechanisms; it is determined, based on the second real-time operation parameter acquired, whether a second locking completion condition is satisfied; and it is determined that locking is completed when the second locking completion condition is satisfied.

Specifically, the second real-time operation parameters may include one or both of the real-time torque and working time of the locking/unlocking head. The real-time torque is output torque of a drive motor in a driving mechanism corresponding to the locking/unlocking head, and the torque may be computed according to output current of the drive motor for example. The working time is accumulated time of the locking/unlocking head after start of rotation, and the accumulated time may be obtained by means of a timer for example. Certainly, those skilled in the art may also acquire the real-time torque and working time of the locking/unlocking heads in other ways, which are not limited by the disclosure.

In the disclosure, the second real-time operation parameters include third real-time torque and working time, and the step that after the second real-time operation parameters are acquired, whether the second locking completion condition is satisfied is determined further includes the following steps: each third real-time torque is compared with a corresponding target torque threshold; it is determined that the second locking completion condition is satisfied if each third real-time torque is greater than or equal to the corresponding target torque threshold; or each period of working time is compared with a preset time threshold if each third real-time torque is smaller than the corresponding target torque threshold; and it is determined that the second locking completion condition is satisfied if each period of working time is greater than or equal to the preset time threshold.

For example, when the fire alarm signal appears, the vehicle needs to leave the parking platform quickly, and in this case, a locking effect of the battery locking mechanisms needs to be ensured first. Therefore, in the locking process, each third real-time torque is compared with the corresponding target torque threshold according to acquired third real-time torque of each locking/unlocking head Similar to the above implementations, the target torque threshold corresponding to each locking/unlocking head may be the same as the above target torque threshold or not, and those skilled in the art may choose the target torque threshold on the basis of specific application scenarios. It is determined that the second locking completion condition is satisfied if the third real-time torque of each locking/unlocking head is greater than or equal to the corresponding target torque threshold. In this case, the battery is already locked securely. The working time of each locking/unlocking head is compared with the preset time threshold if the third real-time torque is smaller than the corresponding target torque threshold. Preset time may be determined through tests. For example, when all the locking/unlocking heads are normal, time during which all the locking/unlocking heads are locked is counted, and the time is taken as the preset time. When the working time of each locking/unlocking head is longer than the preset time, all the locking/unlocking heads are locked except the battery locking mechanisms with faults. In this case, it is determined that the second locking completion condition is satisfied. It is determined that locking is completed and the vehicle may quickly leave the battery charging and swap station after the second locking completion condition is satisfied.

It is determined that the second locking completion condition is satisfied when the third real-time torque of each locking/unlocking head is greater than or equal to the target torque threshold, or it is determined that the second locking completion condition is satisfied when the above conditions are not satisfied but the working time of each locking/unlocking head reaches the preset time threshold, such that the disclosure may enable the vehicle to leave quickly on the premise of satisfying locking reliability.

In an implementation, the battery swap control method further includes the following step: when it is determined that locking is completed, the centring apparatus, the hoisting apparatus and the battery swap apparatus are controlled to return to the initial positions, and the closable door is controlled to be closed, so as to enable the vehicle with a battery to be swapped to leave the parking platform.

For example, after it is determined that locking is completed, all the devices in the battery charging and swap station are still in working positions. In order to facilitate quick leaving of the vehicle from the battery charging and swap station, after it is determined that locking is completed, all the devices are controlled to return to the initial positions, such that the vehicle may leave quickly.

When locking is completed, the centring apparatus, the hoisting apparatus and the battery swap apparatus are controlled to return to the initial positions, and the closable door is controlled to be closed, such that convenient conditions may be provided for the vehicle to leave, and the vehicle is enabled to leave quickly.

Certainly, the above control mode of the centring apparatus, the hoisting apparatus, the battery swap apparatus and the closable door is only based on the arrangement mode of the battery charging and swap station of the disclosure. After the arrangement mode of the battery charging and swap station is adjusted, those skilled in the art may modify the above control mode accordingly, as long as all the devices are controlled to return to the initial positions to facilitate quick leaving of the vehicle.

In an implementation, the battery swap control method further includes the following steps: it is determined whether the vehicle with a battery to be swapped is provided with a leaving condition if the battery swap stage is not the preset stage; prompt information is sent out so as to enable the vehicle with a battery to be swapped to leave the parking platform if the vehicle with a battery to be swapped is provided with the leaving condition; or fire-fighting treatment is conducted on a thermal runaway battery if the vehicle with a battery to be swapped is not provided with the leaving condition.

For example, if the acquired battery swap stage is not one of the above three stages, there are two conditions of the battery, where the battery is completely detached, or the battery is mounted on the vehicle. If the battery is completely detached, there are too many steps to mount the battery on the vehicle again, resulting in too long time. In this case, it is determined that the vehicle with a battery to be swapped is not provided with the leaving condition. On the contrary, if the battery is already mounted on the vehicle, the vehicle may leave the parking platform immediately, no matter whether a used battery is not detached or the battery to be mounted is already mounted. In this case, it is determined that the vehicle with a battery to be swapped is provided with the leaving condition.

The prompt information is sent out when the vehicle with a battery to be swapped is provided with the leaving condition, such that the vehicle may be prompted to leave as soon as possible. The prompt information may be transmitted to users or the staff through voice, texts, images, etc., and specific modes are not repeated herein. When the vehicle with a battery to be swapped is not provided with the leaving condition, the battery charging and swap station is directly controlled to conduct fire-fighting treatment on the thermal runaway battery, for example, to transport the thermal runaway battery out of the battery charging and swap station or to spray and cool the thermal runaway battery.

In an implementation, the battery swap control method further includes the following step: fire-fighting treatment is conducted on the thermal runaway battery after the vehicle leaves the parking platform.

For example, it may be determined whether the vehicle leaves the parking platform on the basis of a position sensor or a visual camera, and after the vehicle leaves the parking platform, fire-fighting treatment is immediately conducted on the thermal runaway battery, for example, the thermal runaway battery is transported out of the battery charging and swap station, or the thermal runaway battery is sprayed and cooled.

The prompt information is sent out when the vehicle is provided with the leaving condition, such that the vehicle may be prompted to leave as soon as possible, and fire-fighting efficiency may be improved. Fire-fighting treatment is conducted on the thermal runaway battery after the vehicle is not provided with the leaving condition, or after the vehicle leaves the parking platform, such that fire-fighting treatment may be conducted on the thermal runaway battery in time, and loss of the battery charging and swap station and a user may be reduced.

A possible battery swap process of the disclosure will be introduced below. In a possible implementation:

(1) Battery swap is started. A vehicle enters a parking platform, and four tires are supported on roller apparatuses respectively, such that the vehicle is positioned in a lengthwise direction. Then, a centring apparatus is started to push wheels so as to centre and position the vehicle. After centring and positioning are completed, a hoisting apparatus is started to hoist the vehicle to a certain height, and at the same time, a closable door is opened. Then, step (2) is executed.

(2) A used battery is unlocked. A battery bearing platform of a battery swap apparatus is lifted to an unlocking working position under the action of a lifting mechanism, and after the battery bearing platform reaches the unlocking working position, locking/unlocking mechanisms are combined with battery locking mechanisms, and unlock the battery locking mechanisms. After unlocking is completed, the used battery falls on the battery bearing platform, and the battery bearing platform bears the used battery to descend to a transfer position. Then, step (3) is executed.

(3) The battery is transferred. The battery swap apparatus transfers the used battery to a battery rack of a battery charging and swap station for charging, and at the same time, the battery charging and swap station transfers a battery to be mounted to the battery bearing platform, and the battery bearing platform is positioned and connected with the battery to be mounted. Then, step (5) is executed.

(4) The battery to be mounted is locked. The battery bearing platform is lifted to a locking working position under the action of the lifting mechanism, and after the battery bearing platform reaches the locking working position, the locking/unlocking mechanisms lock the battery locking mechanisms. In a locking process, first real-time torque and the number of turns of each locking/unlocking head are acquired, and whether the first real-time torque of each locking/unlocking head is greater than or equal to a corresponding target torque threshold and whether the number of turns of each locking/unlocking head is greater than or equal to a corresponding target threshold number of turns are determined.

(41) It is determined that locking is completed if each first real-time torque is greater than or equal to the corresponding target torque threshold, and each number of turns is greater than or equal to the corresponding target threshold number of turns. Then, step (5) is executed.

(42) It is determined that there is a locking fault if the first real-time torque is smaller than the target torque threshold, or the number of turns is smaller than the target threshold number of turns. In this case, alarm information is sent out, and the backstage service personnel trigger a one-button locking instruction. After the one-button locking instruction is triggered, the battery to be mounted is locked again, second real-time torque of each locking/unlocking head is acquired, and whether the second real-time torque is greater than or equal to the corresponding target torque threshold is determined.

(421) It is determined that locking is completed if each second real-time torque is greater than or equal to the corresponding target torque threshold. Then, step (5) is executed.

(422) The positions and number of the locking/unlocking heads with first real-time torque smaller than the target torque threshold and number of turns smaller than the target threshold number of turns are acquired if the second real-time torque is smaller than the corresponding target torque threshold. It is determined whether a first locking completion condition is satisfied on the basis of the acquired positions and number of locking/unlocking heads.

(4221) If there is no locking fault of side locking/unlocking heads, and at most one locking/unlocking head of each type of locking/unlocking heads in top locking/unlocking heads, middle locking/unlocking heads and bottom locking/unlocking heads has a locking fault, or if one of side locking/unlocking heads has a locking fault, and there is no locking fault of other top locking/unlocking heads, middle locking/unlocking heads and bottom locking/unlocking heads, it is determined that the first locking completion condition is satisfied and locking is completed. Then, step (5) is executed.

(4222) If at least two of side locking/unlocking heads have the locking fault, or if one of the side locking/unlocking heads has the locking fault, and at least one locking/unlocking head in other top locking/unlocking heads, middle locking/unlocking heads and bottom locking/unlocking heads has the locking fault; or if there is no locking fault of side locking/unlocking heads, and at least two locking/unlocking heads of at least one type of the top locking/unlocking heads, the middle locking/unlocking heads, and the bottom locking/unlocking heads have the locking fault, it is determined that the first locking completion condition is not satisfied and locking is not completed. Then, step (6) is executed.

(5) Apparatuses are reset. The battery swap apparatus, the hoisting apparatus and the centring apparatus are controlled to return to initial positions, and the closable door is controlled to be closed. In this case, battery swap is completed, and the vehicle may leave the battery charging and swap station.

(6) Alarm information is transmitted to prompt the staff to lock manually.

(7) Fault information is recorded in a backstage. Under the condition that the first locking completion condition is satisfied and completion of locking is determined after one-button locking, fault position information is transmitted to a server, such that the backstage service personnel may negotiate with a user to swap a battery locking mechanism with a fault then.

(8) A fire alarm is triggered. In a battery swap process, a current battery swap stage is acquired in response to a received fire alarm signal; and it is determined which one of an unlocking stage, a locking stage or a shutdown and error reporting stage the current battery swap stage is.

(81) The battery swap apparatus is controlled to lock the battery locking mechanisms if the current battery swap stage is one of the unlocking stage, the locking stage or the shutdown and error reporting stage. In the locking process, third real-time torque and working time of each locking/unlocking head are acquired, and whether each third torque is greater than or equal to the corresponding target torque threshold is determined.

(811) It is determined that the second locking completion condition is satisfied and locking is completed if each third real-time torque is greater than or equal to the corresponding target torque threshold, and then prompt information is sent out to prompt the user to leave the parking platform as soon as possible.

(812) The working time of each locking/unlocking head is compared with a preset time threshold if the third real-time torque is smaller than the corresponding target torque threshold, when the working time of each locking/unlocking head is greater than or equal to the preset time threshold, it is determined that the second locking completion condition is satisfied and locking is completed, and then the prompt information is sent out to prompt the user to leave the parking platform as soon as possible.

(82) Whether the battery is mounted on a chassis of the vehicle is determined if the current battery swap stage is not one of the unlocking stage, the locking stage or the shutdown and error reporting stage.

(821) If the battery is mounted on the chassis of the vehicle, the prompt information is sent out to prompt the user to leave the parking platform as soon as possible. Then, step (9) is executed.

(822) If the battery is not mounted on the chassis of the vehicle, step (9) is directly executed.

(9) Fire-fighting treatment is conducted. Fire-fighting treatment is conducted on a thermal runaway battery.

Although the steps are described in the above order in the embodiments, those skilled in the art can understand that in order to achieve effects of the embodiments, different steps are not necessarily executed in this order, but can be executed simultaneously (in parallel) or in a reverse order, and these simple variations are within the scope of protection of the disclosure.

Figure 7:
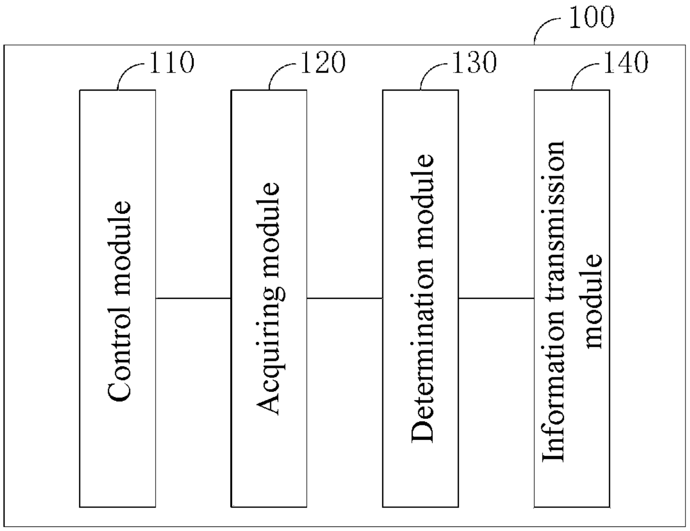
FIG. 7 is a system diagram of a battery swap control system according to the disclosure.

The following briefly describes, with reference to FIG. 7, a battery swap control system according to the disclosure. FIG. 7 is a system diagram of a battery swap control system according to the disclosure.

As shown in FIG. 7, the battery swap control system 100 of the disclosure is applied to a battery charging and swap station. The battery charging and swap station includes a parking platform and a battery swap apparatus, the parking platform is arranged to allow a vehicle with a battery to be swapped to be parked on the parking platform, the battery swap apparatus includes a plurality of locking/unlocking mechanisms, and the locking/unlocking mechanisms are arranged to be capable of locking/unlocking battery locking mechanisms by means of locking/unlocking heads. The battery swap control system 100 includes: a control module 110, an acquiring module 120, and a determination module 130. The control module 110 is configured to control the locking/unlocking mechanisms to lock the battery locking mechanisms. The acquiring module 120 is configured to acquire a first real-time operation parameter of each locking/unlocking head in a process of locking the battery locking mechanisms by the locking/unlocking mechanisms. The determination module 130 is configured to determine, based on the first real-time operation parameter acquired, whether the locking/unlocking head has a locking fault. The acquiring module 120 is further configured to acquire the number and positions of the locking/unlocking heads having the locking fault when any of the locking/unlocking heads has a locking fault. The determination module 130 is further configured to determine whether a first locking completion condition is satisfied according to the acquired number and positions of locking/unlocking heads; and determine that locking is completed when the first locking completion condition is satisfied. In an implementation, for detailed description of function implementation, reference may be made to the description of S101-S109.

In an implementation, the locking/unlocking heads are divided, according to positions of the battery locking mechanisms corresponding to the locking/unlocking heads relative to the battery, into first-type locking/unlocking heads and second-type locking/unlocking heads, where the first-type locking/unlocking heads are configured to lock/unlock the battery locking mechanisms that provide a main load-bearing function, and the second-type locking/unlocking heads are configured to lock/unlock the battery locking mechanisms that provide an auxiliary load-bearing function. The determination module 130 is further configured to determine whether the first locking completion condition is satisfied according to the acquired number and positions of locking/unlocking heads through following steps: if none of the first-type locking/unlocking heads has a locking fault, it is determined whether the first locking completion condition is satisfied on the basis of the number and positions of the locking/unlocking heads having the locking fault in the second-type locking/unlocking heads; and/or if at most one of the first-type locking/unlocking heads has the locking fault and none of the second-type locking/unlocking heads has the locking fault, it is determined that the first locking completion condition is satisfied. In an implementation, for detailed description of function implementation, reference may be made to the method steps described above.

In an implementation, the first-type locking/unlocking heads include side locking/unlocking heads, and the second-type locking/unlocking heads include top locking/unlocking heads, middle locking/unlocking heads, and bottom locking/unlocking heads. The determination module 130 is further configured to determine whether the first locking completion condition is satisfied on the basis of the number and positions of the locking/unlocking heads having the locking fault in the second-type locking/unlocking heads through the following step: if at most one of the top locking/unlocking heads, at most one of the middle locking/unlocking heads, and at most one of the bottom locking/unlocking heads have the locking fault, determining that the first locking completion condition is satisfied. In an implementation, for detailed description of function implementation, reference may be made to the method steps described above.

In an implementation, the determination module 130 is further configured to determine whether the first locking completion condition is satisfied according to the acquired number and positions of locking/unlocking heads through the following steps: if at least two of the first-type locking/unlocking heads have the locking fault, it is determined that the first locking completion condition is not satisfied; if at least one of the first-type locking/unlocking heads and at least one of the second-type locking/unlocking heads have the locking fault, it is determined that the first locking completion condition is not satisfied; and if at least two locking/unlocking heads in at least one type of the top locking/unlocking heads, the middle locking/unlocking heads, and the bottom locking/unlocking heads have the locking fault, it is determined that the first locking completion condition is not satisfied. In an implementation, for detailed description of function implementation, reference may be made to the method steps described above.

In an implementation, the battery swap control system 100 further includes: an information transmission module 140, where an alarm module is arranged to send out alarm information when the first locking completion condition is not satisfied. In an implementation, for detailed description of function implementation, reference may be made to the method steps described above.

In an implementation, the first real-time operation parameter includes a first real-time torque and the number of turns, and the determination module 130 is further configured to determine, based on the first real-time operation parameter acquired, whether the locking/unlocking head has a locking fault through the following steps: each first real-time torque is compared with a corresponding target torque threshold, and each number of turns is compared with a corresponding target threshold number of turns; and if the first real-time torque is smaller than the corresponding target torque threshold or the number of turns is smaller than the corresponding target threshold number of turns, it is determined that the locking/unlocking head has the locking fault. In an implementation, for detailed description of function implementation, reference may be made to the method steps described above.

In an implementation, the control module 110 is further configured to control, before acquiring the number and positions of the locking/unlocking heads having the locking fault, the locking/unlocking mechanisms to lock the battery locking mechanisms in response to a received one-button locking instruction. The acquiring module 120 is further configured to acquire a second real-time torque of each locking/unlocking head in the process of locking the battery locking mechanisms by the locking/unlocking mechanisms; The determination module 130 is further configured to compare each second real-time torque with a corresponding target torque threshold; and determine that locking is completed if each second real-time torque is greater than or equal to the corresponding target torque threshold. The acquiring module 120 is further configured to acquire the number and positions of the locking/unlocking heads having the locking fault when the second real-time torque is smaller than the corresponding target torque threshold. In an implementation, for detailed description of function implementation, reference may be made to the method steps described above.

In an implementation, in the battery swap control system 100, the information transmission module 140 is further configured to transmit fault position information to a server when the first locking completion condition is satisfied. In an implementation, for detailed description of function implementation, reference may be made to the method steps described above.

In an implementation, the acquiring module 120 is further configured to acquire a current battery swap stage in response to a received fire alarm signal. The determination module 130 is further configured to determine whether the battery swap stage is a preset stage. The control module 110 is further configured to control the locking/unlocking mechanisms to lock the battery locking mechanisms when the battery swap stage is the preset stage. The preset stage includes at least one of a locking stage, an unlocking stage, and a shutdown and error reporting stage. In an implementation, for detailed description of function implementation, reference may be made to the method steps described above.

In an implementation, the acquiring module 120 is further configured to acquire a second real-time operation parameter of each locking/unlocking head in the process of locking the battery locking mechanisms by the locking/unlocking mechanisms. The determination module 130 is further configured to determine, based on the second real-time operation parameter acquired, whether a second locking completion condition is satisfied; and determine that locking is completed when the second locking completion condition is satisfied. In an implementation, for detailed description of function implementation, reference may be made to the method steps described above.

In an implementation, the second real-time operation parameter includes a third real-time torque and working time, and the determination module 130 is further configured to determine, based on the second real-time operation parameter acquired, whether the second locking completion condition is satisfied through the following steps: each third real-time torque is compared with a target torque threshold; it is determined that the second locking completion condition is satisfied if each third real-time torque is greater than or equal to the target torque threshold; or each period of working time is compared with a preset time threshold if each third real-time torque is smaller than the corresponding target torque threshold; and it is determined that the second locking completion condition is satisfied if each period of working time is greater than or equal to the preset time threshold. In an implementation, for detailed description of function implementation, reference may be made to the method steps described above.

In an implementation, the battery charging and swap station further includes a centring apparatus and a hoisting apparatus, and the parking platform is further provided with a closable door, where the centring apparatus is arranged to be capable of centring the vehicle with a battery to be swapped, the hoisting apparatus is arranged to be capable of hoisting the vehicle with a battery to be swapped, the closable door is arranged, in an opened state, to allow the locking/unlocking heads to pass through and lock/unlock the battery locking mechanisms, and the control module 110 is further configured to control, when it is determined that locking is completed, the centring apparatus, the hoisting apparatus and the battery swap apparatus to return to initial positions, and control the closable door to be closed, so as to enable the vehicle with a battery to be swapped to leave the parking platform. In an implementation, for detailed description of function implementation, reference may be made to the method steps described above.

In an implementation, the determination module 130 is further configured to determine whether the vehicle with a battery to be swapped is provided with a leaving condition when the battery swap stage is not the preset stage. The information transmission module 140 is further configured to send out prompt information so as to enable the vehicle with a battery to be swapped to leave the parking platform when the vehicle with a battery to be swapped is provided with the leaving condition. The control module 110 is further configured to conduct fire-fighting treatment on a thermal runaway battery when the vehicle with a battery to be swapped is not provided with the leaving condition. In an implementation, for detailed description of function implementation, reference may be made to the method steps described above.

In an implementation, the control module 110 is further configured to conduct fire-fighting treatment on the thermal runaway battery after the vehicle leaves the parking platform. In an implementation, for detailed description of function implementation, reference may be made to the method steps described above.

It should be noted that a safety protection system for the battery charging and swap station provided in the above embodiments is only illustrated by division of the above functional modules (such as the control module 110, the acquiring module 120, the determination module 130, and the information transmission module 140). In practical applications, the above functional modules may be implemented by different functional units as required, i.e., the functional modules in the embodiment are further split or combined, for example, the functional modules in the above embodiments may be combined into one functional module, or further split into a plurality of sub-modules, so as to complete all or some functions described above. Names of the functional modules involved in the embodiment are only for distinguishing purpose and are not to be construed as limiting the disclosure.

Those skilled in the art can understand that all or some procedures in the method of one of the above embodiments of the disclosure may also be implemented by a computer program instructing relevant hardware. The computer program may be stored in a computer-readable storage medium, and when the computer program is executed by a processor, the steps of the above method embodiments can be implemented. The computer program includes computer program codes, which may be in a source code form, an object code form, an executable file form, some intermediate forms, etc. The computer-readable storage medium may include: any entity or apparatus that can carry the computer program codes, such as a medium, a USB flash drive, a removable hard disk, a magnetic disk, an optical disc, a computer memory, a read-only memory, a random access memory, an electrical carrier signal, a telecommunications signal, and a software distribution medium. It should be noted that the content included in the computer-readable storage medium can be appropriately added or deleted according to requirements of the legislation and patent practice in a jurisdiction. For example, in some jurisdictions, according to the legislation and patent practice, the computer-readable storage medium does not include an electrical carrier signal and a telecommunications signal.

Various embodiments regarding components in the disclosure may be implemented in hardware, or implemented by software modules running on one or more processors, or implemented in combinations thereof. Those skilled in the art should understand that a microprocessor or a digital signal processor (DSP) may be used in practice to implement some or all functions of some or all components in the server and client according to the embodiments of the disclosure. The disclosure may be further implemented as devices or device programs (for example, personal computer (PC) programs and PC program products) for implementing some or all methods as described herein. Such programs for implementing the disclosure may be stored on a PC readable medium, or may be in the form of one or more signals. Such signals may be downloaded from an Internet website, or provided on a carrier signal, or provided in any other form.

The disclosure further provides a computer-readable storage medium. In an embodiment of the computer-readable storage medium according to the disclosure, the computer-readable storage medium may be configured to store a program for implementing the battery swap control method in the above method embodiment, and the program may be loaded and run by a processor to implement the above the battery swap control method. For ease of description, only parts related to the embodiments of the disclosure are shown. For specific technical details that are not disclosed, reference may be made to the method part of the embodiments of the disclosure. The computer-readable storage medium may be a storage apparatus formed by various electronic devices. Optionally, the computer-readable storage medium in the embodiment of the disclosure is a non-transitory computer-readable storage medium.

The disclosure further provides a control apparatus. In an embodiment of the control apparatus according to the disclosure, the control apparatus includes a processor and a memory. The memory may be configured to store a program for implementing the battery swap control method in the above method embodiment, and the processor may be configured to execute the program in the memory. The program includes, but is not limited to, the program for implementing the battery swap control method in the above method embodiment. For ease of description, only parts related to the embodiments of the disclosure are shown. For specific technical details that are not disclosed, reference may be made to the method part of the embodiments of the disclosure. The control apparatus may be an apparatus device formed by various electronic devices.

The disclosure further provides a battery charging and swap station. The battery charging and swap station includes a parking platform and a battery swap apparatus, the parking platform is arranged to allow a vehicle with a battery to be swapped to be parked on the parking platform, the battery swap apparatus includes a plurality of locking/unlocking mechanisms, the locking/unlocking mechanisms are arranged to be capable of locking/unlocking battery locking mechanisms by means of locking/unlocking heads, and the battery charging and swap station further includes the above control apparatus.

Heretofore, the technical solutions of the disclosure have been described with reference to the preferred implementations shown in the accompanying drawings. However, those skilled in the art can readily understand that the scope of protection of the disclosure is apparently not limited to these specific implementations. Those skilled in the art can make equivalent changes or substitutions to the related technical features without departing from the principle of the disclosure, and all the technical solutions with such changes or substitutions shall fall within the scope of protection of the disclosure.

What is claimed is:

1. A battery swap control method, applied to a battery charging and swap station, wherein the battery charging and swap station comprises a parking platform and a battery swap apparatus, the parking platform is arranged to allow a vehicle with a battery to be swapped to be parked on the parking platform, and the battery swap apparatus comprises a plurality of locking/unlocking mechanisms, which are arranged to be capable of locking/unlocking battery locking mechanisms by means of locking/unlocking heads, and the battery swap control method comprising:

acquiring a first real-time operation parameter of each locking/unlocking head in a process of locking the battery locking mechanisms by the locking/unlocking mechanisms;

determining, based on the first real-time operation parameter acquired, whether the locking/unlocking head has a locking fault;

if any of the locking/unlocking heads has a locking fault, acquiring a number and positions of the locking/unlocking heads having the locking fault;

determining whether a first locking completion condition is satisfied according to the acquired number and positions of locking/unlocking heads; and determining that locking is completed when the first locking completion condition is satisfied, wherein the locking/unlocking heads are divided, according to positions of the battery locking mechanisms corresponding to the locking/unlocking heads relative to the battery, into first-type locking/unlocking heads and second-type locking/unlocking heads, wherein the first-type locking/unlocking heads are configured to lock/unlock the battery locking mechanisms that provide a main load-bearing function, and the second-type locking/unlocking heads are configured to lock/unlock the battery locking mechanisms that provide an auxiliary load-bearing function; and the step of "determining whether a first locking completion condition is satisfied according to the acquired number and positions of locking/unlocking heads" further comprises:

if none of the first-type locking/unlocking heads has a locking fault, determining whether the first locking completion condition is satisfied based on the number and positions of the locking/unlocking heads having the locking fault in the second-type locking/unlocking heads; and/or if at most one of the first-type locking/unlocking heads has the locking fault and none of the second-type locking/unlocking heads has the locking fault, determining that the first locking completion condition is satisfied.

2. The battery swap control method according to claim 1, wherein the first-type locking/unlocking heads comprise side locking/unlocking heads, the second-type locking/unlocking heads comprise top locking/unlocking heads, middle locking/unlocking heads, and bottom locking/unlocking heads, and the step of "determining whether the first locking completion condition is satisfied on the basis of the number and positions of the locking/unlocking heads having the locking fault in the second-type locking/unlocking heads" further comprises:

if at most one of the top locking/unlocking heads, at most one of the middle locking/unlocking heads, and at most one of the bottom locking/unlocking heads have the locking fault, determining that the first locking completion condition is satisfied.

3. The battery swap control method according to claim 2, wherein the step of "determining whether a first locking completion condition is satisfied according to the acquired number and positions of locking/unlocking heads" further comprises:

if at least two of the first-type locking/unlocking heads have the locking fault, determining that the first locking completion condition is not satisfied;

if at least one of the first-type locking/unlocking heads and at least one of the second-type locking/unlocking heads have the locking fault, determining that the first locking completion condition is not satisfied; and if at least two locking/unlocking heads in at least one type of the top locking/unlocking heads, the middle locking/unlocking heads, and the bottom locking/unlocking heads have the locking fault, determining that the first locking completion condition is not satisfied.

4. The battery swap control method according to claim 1, further comprising:

sending out alarm information when the first locking completion condition is not satisfied.

5. The battery swap control method according to claim 1, wherein the first real-time operation parameter comprises a first real-time torque and a number of turns, and the step of "determining, based on the first real-time operation parameter acquired, whether the locking/unlocking head has a locking fault" further comprises:

comparing each first real-time torque with a corresponding target torque threshold, and comparing each number of turns with a corresponding target threshold number of turns; and if the first real-time torque is smaller than the corresponding target torque threshold or the number of turns is smaller than the corresponding target threshold number of turns, determining that the locking/unlocking head has the locking fault.

6. The battery swap control method according to claim 1, wherein before the step of "acquiring the number and positions of the locking/unlocking heads having the locking fault", the battery swap control method further comprises:

controlling the locking/unlocking mechanisms to lock the battery locking mechanisms in response to a received one-button locking instruction;

acquiring a second real-time torque of each locking/unlocking head in the process of locking the battery locking mechanisms by the locking/unlocking mechanisms;

comparing each second real-time torque with a corresponding target torque threshold;

determining that locking is completed if each second real-time torque is greater than or equal to the corresponding target torque threshold; or acquiring the number and positions of the locking/unlocking heads having the locking fault if the second real-time torque is smaller than the corresponding target torque threshold.

7. The battery swap control method according to claim 1, further comprising:

transmitting fault position information to a server when the first locking completion condition is satisfied.

8. The battery swap control method according to claim 1, further comprising:

acquiring a current battery swap stage in response to a received fire alarm signal;

determining whether the battery swap stage is a preset stage; and controlling the locking/unlocking mechanisms to lock the battery locking mechanisms if the battery swap stage is the preset stage, wherein the preset stage includes at least one of a locking stage, an unlocking stage, and a shutdown and error reporting stage.

9. The battery swap control method according to claim 8, further comprising:

acquiring a second real-time operation parameter of each locking/unlocking head in a process of locking the battery locking mechanisms by the locking/unlocking mechanisms;

determining, based on the second real-time operation parameter acquired, whether a second locking completion condition is satisfied; and determining that locking is completed when the second locking completion condition is satisfied.

10. The battery swap control method according to claim 9, wherein the second real-time operation parameter includes a third real-time torque and working time, and the step of "determining, based on the second real-time operation parameter acquired, whether a second locking completion condition is satisfied" further includes:

comparing each third real-time torque with a corresponding target torque threshold;

determining that the second locking completion condition is satisfied if each third real-time torque is greater than or equal to the corresponding target torque threshold; or comparing each period of working time with a preset time threshold if each third real-time torque is smaller than the corresponding target torque threshold; and determining that the second locking completion condition is satisfied if each period of working time is greater than or equal to the preset time threshold.

11. The battery swap control method according to claim 9, wherein the battery charging and swap station further includes a centring apparatus and a hoisting apparatus, and the parking platform is further provided with a closable door, where the centring apparatus is arranged to be capable of centring the vehicle with a battery to be swapped, the hoisting apparatus is arranged to be capable of hoisting the vehicle with a battery to be swapped, the closable door is arranged, in an opened state, to allow the locking/unlocking heads to pass through and lock/unlock the battery locking mechanisms, and the battery swap control method further includes:

controlling, when it is determined that locking is completed, the centring apparatus, the hoisting apparatus and the battery swap apparatus to return to initial positions, and controlling the closable door to be closed, so as to enable the vehicle with a battery to be swapped to leave the parking platform.

12. The battery swap control method according to claim 8, further including:

determining whether the vehicle with a battery to be swapped is provided with a leaving condition if the battery swap stage is not the preset stage;

sending out prompt information so as to enable the vehicle with a battery to be swapped to leave the parking platform if the vehicle with a battery to be swapped is provided with the leaving condition; or conducting fire-fighting treatment on a thermal runaway battery if the vehicle with a battery to be swapped does not meet the leaving condition.

13. The battery swap control method according to claim 11, further including:

conducting fire-fighting treatment on a thermal runaway battery after the vehicle leaves the parking platform.

14. A battery swap control system, applied to a battery charging and swap station, wherein the battery charging and swap station includes a parking platform and a battery swap apparatus, the parking platform is arranged to allow a vehicle with a battery to be swapped to be parked on the parking platform, and the battery swap apparatus includes a plurality of locking/unlocking mechanisms, which are arranged to be capable of locking/unlocking battery locking mechanisms by means of locking/unlocking heads, and the battery swap control system includes:

a control module configured to control the locking/unlocking mechanisms to lock the battery locking mechanisms;

an acquiring module configured to acquire a first real-time operation parameter of each locking/unlocking head in a process of locking the battery locking mechanisms by the locking/unlocking mechanisms; and a determination module configured to determine, based on the first real-time operation parameter acquired, whether the locking/unlocking head has a locking fault, wherein:

the acquiring module is further configured to acquire a number and positions of the locking/unlocking heads having the locking fault when any of the locking/unlocking heads has a locking fault; and the determination module is further configured to determine whether a first locking completion condition is satisfied according to the acquired number and positions of locking/unlocking heads; and determine that locking is completed when the first locking completion condition is satisfied, wherein the locking/unlocking heads are divided, according to positions of the battery locking mechanisms corresponding to the locking/unlocking heads relative to the battery, into first-type locking/unlocking heads and second-type locking/unlocking heads, wherein the first-type locking/unlocking heads are configured to lock/unlock the battery locking mechanisms that provide a main load-bearing function, and the second-type locking/unlocking heads are configured to lock/unlock the battery locking mechanisms that provide an auxiliary load-bearing function; and the determination module is further configured to determine whether the first locking completion condition is satisfied according to the acquired number and positions of locking/unlocking heads through following steps:

if none of the first-type locking/unlocking heads has a locking fault, determining whether the first locking completion condition is satisfied based on the number and positions of the locking/unlocking heads having the locking fault in the second-type locking/unlocking heads; and/or if at most one of the first-type locking/unlocking heads has the locking fault and none of the second-type locking/unlocking heads has the locking fault, determining that the first locking completion condition is satisfied.

15. The battery swap control system according to claim 14, wherein the first-type locking/unlocking heads include side locking/unlocking heads, and the second-type locking/unlocking heads include top locking/unlocking heads, middle locking/unlocking heads, and bottom locking/unlocking heads; and the determination module is further configured to determine whether the first locking completion condition is satisfied on the basis of the number and positions of the locking/unlocking heads having the locking fault in the second-type locking/unlocking heads through the following step:

if at most one of the top locking/unlocking heads, at most one of the middle locking/unlocking heads, and at most one of the bottom locking/unlocking heads have the locking fault, determining that the first locking completion condition is satisfied.

16. The battery swap control system according to claim 15, wherein the determination module is further configured to determine whether the first locking completion condition is satisfied according to the acquired number and positions of locking/unlocking heads through the following steps:

if at least two of the first-type locking/unlocking heads have the locking fault, determining that the first locking completion condition is not satisfied;

if at least one of the first-type locking/unlocking heads and at least one of the second-type locking/unlocking heads have the locking fault, determining that the first locking completion condition is not satisfied; and if at least two locking/unlocking heads in at least one type of the top locking/unlocking heads, the middle locking/unlocking heads, and the bottom locking/unlocking heads have the locking fault, determining that the first locking completion condition is not satisfied.

17. The battery swap control system according to claim 14, further including:

an information transmission module, where an alarm module is arranged to send out alarm information when the first locking completion condition is not satisfied.

18. The battery swap control system according to claim 14, wherein the first real-time operation parameter includes a first real-time torque and a number of turns, and the determination module is further configured to determine, based on the first real-time operation parameter acquired, whether the locking/unlocking head has a locking fault through the following steps:

comparing each first real-time torque with a corresponding target torque threshold, and comparing each number of turns with a corresponding target threshold number of turns; and if the first real-time torque is smaller than the corresponding target torque threshold or the number of turns is smaller than the corresponding target threshold number of turns, determining that the locking/unlocking head has the locking fault.

* * * * *